United States Patent
VanHeyningen et al.

(10) Patent No.: US 9,467,290 B2
(45) Date of Patent: Oct. 11, 2016

(54) METHOD AND APPARATUS FOR PROVIDING SECURE STREAMING DATA TRANSMISSION FACILITIES USING UNRELIABLE PROTOCOLS

(71) Applicant: Aventail LLC, San Jose, CA (US)

(72) Inventors: Marc D. VanHeyningen, Seattle, WA (US); Rodger D. Erickson, Dunwoody, GA (US)

(73) Assignee: AVENTAIL LLC, San Jose, CA (US)

( * ) Notice: Subject to any disclaimer, the term of this patent is extended or adjusted under 35 U.S.C. 154(b) by 367 days.

(21) Appl. No.: 13/970,550

(22) Filed: Aug. 19, 2013

(65) Prior Publication Data

US 2013/0346739 A1    Dec. 26, 2013

Related U.S. Application Data

(63) Continuation of application No. 13/004,812, filed on Jan. 11, 2011, now Pat. No. 8,533,457, which is a continuation of application No. 11/927,362, filed on Oct. 29, 2007, now Pat. No. 7,870,380, which is a (Continued)

(51) Int. Cl.
*H04L 29/06* (2006.01)
*H04L 9/12* (2006.01)
(Continued)

(52) U.S. Cl.
CPC .............. *H04L 9/12* (2013.01); *H04L 9/0838* (2013.01); *H04L 9/32* (2013.01); *H04L 63/0428* (2013.01); *H04L 63/0457* (2013.01);
(Continued)

(58) Field of Classification Search
CPC ........................................................ H04L 9/12
USPC ....................................................... 713/153
See application file for complete search history.

(56) References Cited

U.S. PATENT DOCUMENTS 5,325,433 A    6/1994  Torii et al.
5,548,648 A    8/1996  Yorke-Smith (Continued)

FOREIGN PATENT DOCUMENTS

WO    WO 02/065321    8/2002
WO    WO 02/065650    8/2002
WO    WO 02/065691    8/2002

OTHER PUBLICATIONS

U.S. Appl. No. 13/907,113 Office Action mailed Sep. 9, 2014.

(Continued)

*Primary Examiner* — Harris C Wang
(74) *Attorney, Agent, or Firm* — Polsinelli LLP

(57) ABSTRACT

The disclosure provides a method and apparatus for transmitting data securely using an unreliable communication protocol, such as User Datagram Protocol. In one variation, the disclosure describes retaining compatibility with conventional Secure Sockets Layer (SSL) and SOCKS protocols, such that secure UDP datagrams can be transmitted between a proxy server and a client computer in a manner analogous to conventional SOCKS processing. Further, the disclosure describes a network arrangement that employs a cache having copies distributed among a plurality of different locations. SSL/TLS session information for a session with each of the proxy servers is stored in the cache so that it is accessible to at least one other proxy server. Using this arrangement, cached SSL/TLS communication session information may be retrieved and used by a second proxy server to accept a session with the client device when the client device switches proxy servers.

18 Claims, 13 Drawing Sheets

Related U.S. Application Data continuation of application No. 09/783,146, filed on Feb. 13, 2001, now Pat. No. 7,360,075, which is a continuation-in-part of application No. 09/782,593, filed on Feb. 12, 2001, now Pat. No. 7,353,380.

(51) Int. Cl.
*H04L 9/08* (2006.01)
*H04L 9/32* (2006.01)

(52) U.S. Cl.
CPC ............ H04L 63/12 (2013.01); H04L 63/166 (2013.01); *H04L 2209/76* (2013.01)

(56) References Cited

U.S. PATENT DOCUMENTS

| | | |
|---|---|---|
| 5,566,297 A | 10/1996 | Devarakonda et al. |
| 5,583,940 A | 12/1996 | Vidrascu et al. |
| 5,657,390 A | 8/1997 | Elgamal et al. |
| 5,673,319 A | 9/1997 | Bellare et al. |
| 5,692,124 A * | 11/1997 | Holden ............... H04L 63/0823 707/999.009 |
| 5,727,002 A * | 3/1998 | Miller .................. H04L 1/1614 709/237 |
| 5,754,651 A | 5/1998 | Blatter et al. |
| 5,822,531 A | 10/1998 | Gorczyca et al. |
| 5,974,144 A | 10/1999 | Brandman |
| 5,991,810 A | 11/1999 | Shapiro et al. |
| 5,996,086 A | 11/1999 | Delaney et al. |
| 6,006,259 A | 12/1999 | Adelman et al. |
| 6,018,805 A | 1/2000 | Ma et al. |
| 6,029,245 A | 2/2000 | Scanlan |
| 6,038,677 A | 3/2000 | Lawlor et al. |
| 6,061,796 A | 5/2000 | Chen et al. |
| 6,070,245 A | 5/2000 | Murphy, Jr. et al. |
| 6,078,957 A | 6/2000 | Adelman et al. |
| 6,094,485 A | 7/2000 | Weinstein et al. |
| 6,119,230 A | 9/2000 | Carter |
| 6,125,186 A | 9/2000 | Saito et al. |
| 6,125,366 A | 9/2000 | Bernstein et al. |
| 6,141,423 A | 10/2000 | Fischer |
| 6,141,749 A | 10/2000 | Coss et al. |
| 6,145,089 A | 11/2000 | Le et al. |
| 6,148,405 A | 11/2000 | Liao et al. |
| 6,167,438 A | 12/2000 | Yates et al. |
| 6,178,441 B1 | 1/2001 | Elnozahy |
| 6,185,567 B1 | 2/2001 | Ratnaraj et al. |
| 6,185,695 B1 | 2/2001 | Murphy et al. |
| 6,192,417 B1 | 2/2001 | Block et al. |
| 6,195,366 B1 | 2/2001 | Kayashima et al. |
| 6,199,110 B1 | 3/2001 | Rizvi et al. |
| 6,263,437 B1 | 7/2001 | Liao et al. |
| 6,275,588 B1 | 8/2001 | Videcrantz |
| 6,288,739 B1 | 9/2001 | Hales et al. |
| 6,317,729 B1 | 11/2001 | Camp et al. |
| 6,317,831 B1 | 11/2001 | King |
| 6,321,268 B1 | 11/2001 | Dillon et al. |
| 6,333,983 B1 | 12/2001 | Enichen et al. |
| 6,345,288 B1 | 2/2002 | Reed et al. |
| 6,351,539 B1 | 2/2002 | Djakovic |
| 6,385,596 B1 | 5/2002 | Wiser et al. |
| 6,415,031 B1 | 7/2002 | Colligan et al. |
| 6,449,719 B1 * | 9/2002 | Baker ................. H04L 63/0428 348/E7.056 |
| 6,453,343 B1 | 9/2002 | Housel et al. |
| 6,490,610 B1 | 12/2002 | Rizvi et al. |
| 6,502,135 B1 | 12/2002 | Munger et al. |
| 6,505,192 B1 | 1/2003 | Godwin et al. |
| 6,505,253 B1 | 1/2003 | Chiu et al. |
| 6,519,636 B2 | 2/2003 | Engel |
| 6,606,663 B1 | 8/2003 | Liao et al. |
| 6,618,761 B2 | 9/2003 | Munger et al. |
| 6,643,260 B1 | 11/2003 | Kloth et al. |
| 6,728,747 B1 | 4/2004 | Jenkins et al. |
| 6,754,832 B1 | 6/2004 | Godwin et al. |
| 6,766,373 B1 | 7/2004 | Beadle et al. |
| 6,775,772 B1 | 8/2004 | Binding et al. |
| 6,792,424 B1 * | 9/2004 | Burns ..................... H04L 63/10 |
| 6,816,968 B1 | 11/2004 | Walmsley |
| 6,829,720 B2 | 12/2004 | Schoenthal et al. |
| 6,832,316 B1 | 12/2004 | Sibert |
| 6,894,976 B1 * | 5/2005 | Banga .................. H04L 69/166 370/235 |
| 6,947,992 B1 | 9/2005 | Shachor |
| 7,024,692 B1 * | 4/2006 | Schanze ............. H04L 63/0807 726/10 |
| 7,046,802 B2 | 5/2006 | Rogaway |
| 7,058,723 B2 | 6/2006 | Wilson |
| 7,062,570 B2 | 6/2006 | Hong et al. |
| 7,177,424 B1 | 2/2007 | Furuya et al. |
| 7,197,547 B1 | 3/2007 | Miller et al. |
| 7,296,077 B2 | 11/2007 | Harmon et al. |
| 7,304,951 B2 | 12/2007 | Rhee |
| 7,346,925 B2 | 3/2008 | Marejan |
| 7,353,380 B2 | 4/2008 | VanHeyningen |
| 7,360,075 B2 | 4/2008 | VanHeyningen |
| 7,383,329 B2 | 6/2008 | Erickson |
| 7,430,757 B1 * | 9/2008 | Chari ..................... H04L 63/20 709/223 |
| 7,526,533 B1 | 4/2009 | Bue et al. |
| 7,631,084 B2 | 12/2009 | Thomas et al. |
| 7,665,127 B1 | 2/2010 | Rao et al. |
| 7,720,975 B2 | 5/2010 | Erickson |
| 7,870,258 B2 | 1/2011 | Sundaresan et al. |
| 7,870,380 B2 | 1/2011 | VanHeyningen et al. |
| 7,954,144 B1 | 5/2011 | Ebrahimi et al. |
| 8,032,642 B2 | 10/2011 | Erickson |
| 8,458,340 B2 | 6/2013 | Erickson |
| 8,533,457 B2 | 9/2013 | VanHeyningen |
| 8,984,268 B2 | 3/2015 | VanHeyningen |
| 9,043,476 B2 * | 5/2015 | Erickson ................. H04L 29/06 709/227 |
| 2001/0032254 A1 * | 10/2001 | Hawkins ............. G06F 17/3089 709/219 |
| 2002/0023209 A1 | 2/2002 | Domstedt et al. |
| 2002/0073167 A1 | 6/2002 | Powell et al. |
| 2002/0083148 A1 | 6/2002 | Shaw et al. |
| 2002/0094085 A1 | 7/2002 | Roberts |
| 2002/0099829 A1 | 7/2002 | Richards et al. |
| 2002/0112152 A1 | 8/2002 | VanHeyningen et al. |
| 2002/0118836 A1 | 8/2002 | Howard et al. |
| 2002/0138551 A1 | 9/2002 | Erickson |
| 2003/0023845 A1 | 1/2003 | VanHeyningen et al. |
| 2003/0061372 A1 | 3/2003 | Agarwalla et al. |
| 2003/0093511 A1 | 5/2003 | Barde et al. |
| 2003/0167403 A1 * | 9/2003 | McCurley ............... H04L 63/02 726/14 |
| 2004/0107286 A1 | 6/2004 | Larson et al. |
| 2005/0273849 A1 | 12/2005 | Araujo et al. |
| 2006/0155857 A1 | 7/2006 | Feenan et al. |
| 2006/0291452 A1 * | 12/2006 | Velagaleti ............. H04L 1/1671 370/352 |
| 2007/0180125 A1 | 8/2007 | Knowles et al. |
| 2008/0040550 A1 | 2/2008 | Lindner |
| 2008/0104390 A1 | 5/2008 | VanHeyningen et al. |
| 2008/0104686 A1 | 5/2008 | Erickson |
| 2008/0141020 A1 | 6/2008 | VanHeyningen |
| 2009/0199285 A1 | 8/2009 | Agarwal et al. |
| 2010/0185728 A1 | 7/2010 | Erickson |
| 2011/0173436 A1 | 7/2011 | VanHeyningen |
| 2012/0023241 A1 | 1/2012 | Goel et al. |
| 2012/0084384 A1 | 4/2012 | Erickson |
| 2013/0268617 A1 | 10/2013 | Erickson |
| 2013/0346739 A1 * | 12/2013 | VanHeyningen ......... H04L 9/12 713/153 |
| 2014/0040616 A1 * | 2/2014 | Barber ................. G06F 11/1453 713/168 |
| 2015/0326685 A1 | 11/2015 | Erickson |

OTHER PUBLICATIONS

"BCM5820 E-Commerce Processor," BCM 5820 Product Brief, Broadcom, 2000, Irvine, California.

(56) References Cited

OTHER PUBLICATIONS

"MTP: Multicast Transport Protocol," an article posted on the Network and Telecommunications Research Group website address http://ntrg.cd.tcd.ie/4ba2/multicast/magnus/index.html on Jan. 24, 2001.
"Nokia VPN Gateways: Patented IP Clustering Technology Provides True Active Session Failover and Dynamic Load Balancing," Tech Note, Nokia Connecting People.
"TIB/Rendezvous Administration," Tibco Software Inc., Dec. 1999.
"TIB/Rendezvous C Reference," Tibco Software Inc., Dec. 1999.
"TIB/Rendezvous Concepts," Tibco Software Inc., Dec. 1999.
"TIB/Rendezvous Installation," Tibco Software Inc., Dec. 1999.
"TIB/Rendezvous Java Reference," Tibco Software Inc., Dec. 1999.
Armstrong, S. et al., "Multicast Transport Protocol," Network Working Group, Request for Comment: 1301, Feb. 1992.
Hamer, John "HasB.sml-Hashing Functions for Lab 2-B," Jun. 2000.
Information printed from website (www.broadcom.com/doc/promo5820.html) on Aug. 15, 2001, 6 pages.
Information printed from website (www.openssl.org/docs/apps/openssl.html) on Jul. 2, 2001, 7 pages.
Information printed from website (www.openssl.org/docs/crypto/crypto.html) on Jul. 2, 2001, 2 pages.
Information printed from website (www.openssl.org/docs/HOWTO/) on Jul. 2, 2001, 1 page.
Information printed from website (www.openssl.org/docs/ssl/ssl.html) on Jul. 2, 2001, 15 pages.
Leech, M. et al., Internet Engineering Task Force (IETF) Request for Comment (RFC) 1928, "SOCKS Protocol V5," Mar. 1996.
Leech, M. et al., Internet Engineering Task Force (IETF) Request for Comment (RFC) 1929, "Username/Password Authentication for SOCKS V5," Mar. 1996.
McGrew, David A., David Oran, Cisco Systems et al. "The Secure Real Time Protocol." Nov. 2000. Cisco Systems IETF Standard-Working-Draft, Internet Engineering Task Force, CH XP015032291. ISSN: 000-0004.
Rescorla, E. "SSL and TLS, Designing and Building Secure Systems" Addison Wesley Publishing, pp. 43-55, 57-67, and 88-91, Oct. 2000.
Simon. D. "Microsoft Corporation, Microsoft Corporation's PCT Protocol," Document version 2.00, Apr. 1996, 38 pages.
The Authoritative Dictionary of IEEE Standard Terms, 2000 by IEEE, Inc., Seventh Edition, pp. 505-506.
Thomas, S. "SSL and TLS Essentials, Securing the Web" Wiley Publishing, Table of Contents pp. ix-xiii, pp. 10-11, p. 13, and pp. 118-129 (additional information from this book will be provided upon the Examiner's request), Feb. 2000.
Tung, B. "Kerberos A Network Authentication System" Addison Wesley Networking Basics Series, entire book pp. vii-164, May 1999.
U.S. Appl. No. 60/182,355, filed Feb. 14, 2000.
Uzgalis, Robert "Hasing Concepts and the Java Programming Language," Computer Science Departement, University of Auckland, Auckland, New Zealand, 1996.
Wireless Application Protocol, Wireless Transport Layer Security Specification, WAP WTLS WAP-199-WTLS, Version 18, Feb. 2000, 99 pages.
International Search Report for PCT/US02/03859 mailed May 30, 2002, 2 pages.
International Search Report for PCT/US02/03625 mailed Dec. 12, 2002, 1 page.
International Search Report for PCT/US02/03626 mailed May 7, 2002.
Supplementary European Search Report in corresponding European Patent Office application, No. EP02714859, mailed Aug. 1, 2005.
Office Action for U.S. Appl. No. 09/782,593 mailed Sep. 18, 2007.
Final Office Action for U.S. Appl. No. 09/782,593 mailed Jul. 3, 2006.
Office Action for U.S. Appl. No. 09/782,593 mailed Oct. 21, 2005.
Office Action for U.S. Appl. No. 09/782,593 mailed Apr. 22, 2005.
Office Action for U.S. Appl. No. 09/782,593 mailed Jun. 17, 2004.
Final Office Action for U.S. Appl. No. 09/783,146 mailed Dec. 20, 2005.
Office Action for U.S. Appl. No. 09/783,146 mailed Jul. 26, 2005.
Office Action for U.S. Appl. No. 09/783,146 mailed Dec. 15, 2004.
Final Office Action for U.S. Appl. No. 11/927,371 mailed Oct. 29, 2009.
Office Action for U.S. Appl. No. 11/927,371 mailed Jun. 23, 2009.
Final Office Action for U.S. Appl. No. 11/927,362 mailed Jun. 4, 2010.
Office Action for U.S. Appl. No. 11/927,362 mailed Jan. 8, 2010.
Office Action for U.S. Appl. No. 13/004,812 mailed Jan. 17, 2013.
Office Action for U.S. Appl. No. 13/004,812 mailed Mar. 12, 2012.
Office Action for U.S. Appl. No. 13/004,812 mailed Sep. 14, 2011.
Office Action for U.S. Appl. No. 09/783,147 mailed Oct. 30, 2006.
Office Action for U.S. Appl. No. 09/783,147 mailed Oct. 8, 2004.
Office Action for U.S. Appl. No. 11/927,350 mailed Oct. 8, 2009.
Office Action for U.S. Appl. No. 11/927,350 mailed May 13, 2009.
Office Action for U.S. Appl. No. 12/694,198 mailed Dec. 16, 2010.
Office Action for U.S. Appl. No. 13/252,170 mailed Aug. 28, 2012.
Final Office Action for U.S. Appl. No. 13/252,170 mailed Apr. 9, 2012.
Office Action for U.S. Appl. No. 13/252,170 mailed Feb. 1, 2012.
U.S. Appl. No. 14/722,040, Rodger D. Erickson, Distributed Cache for State Transfer Operations, filed May 26, 2015.

* cited by examiner

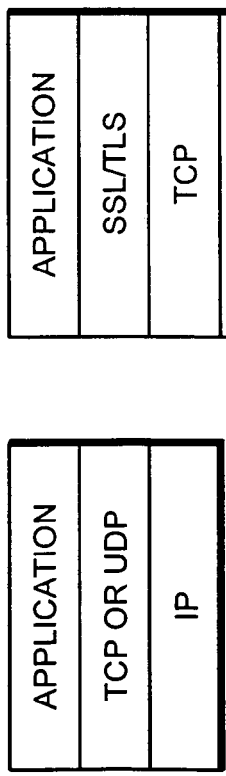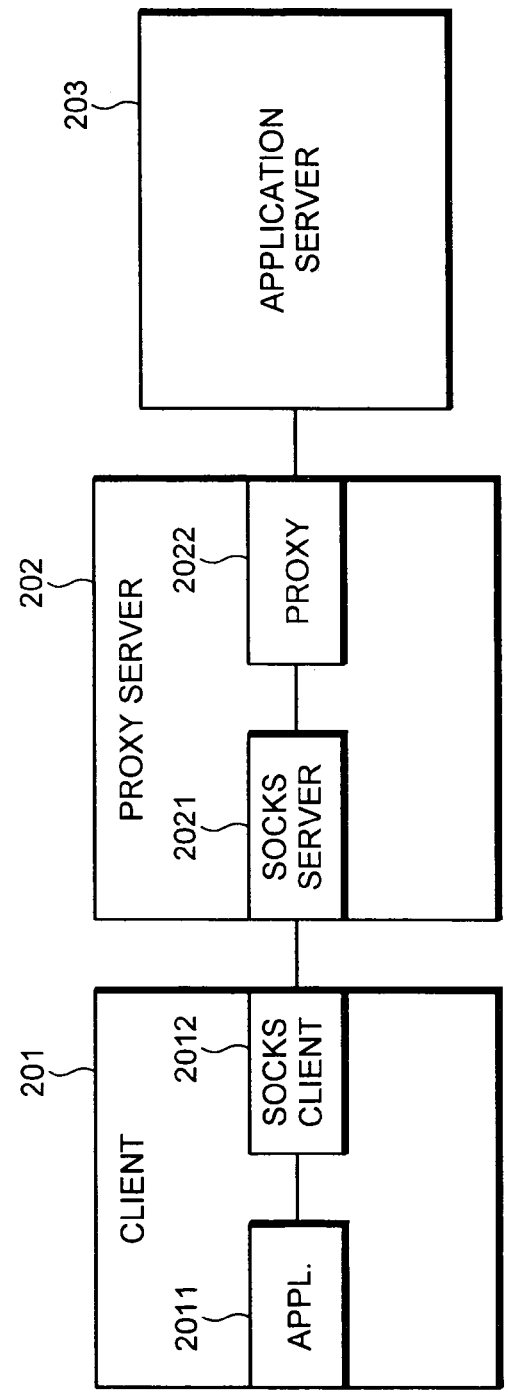

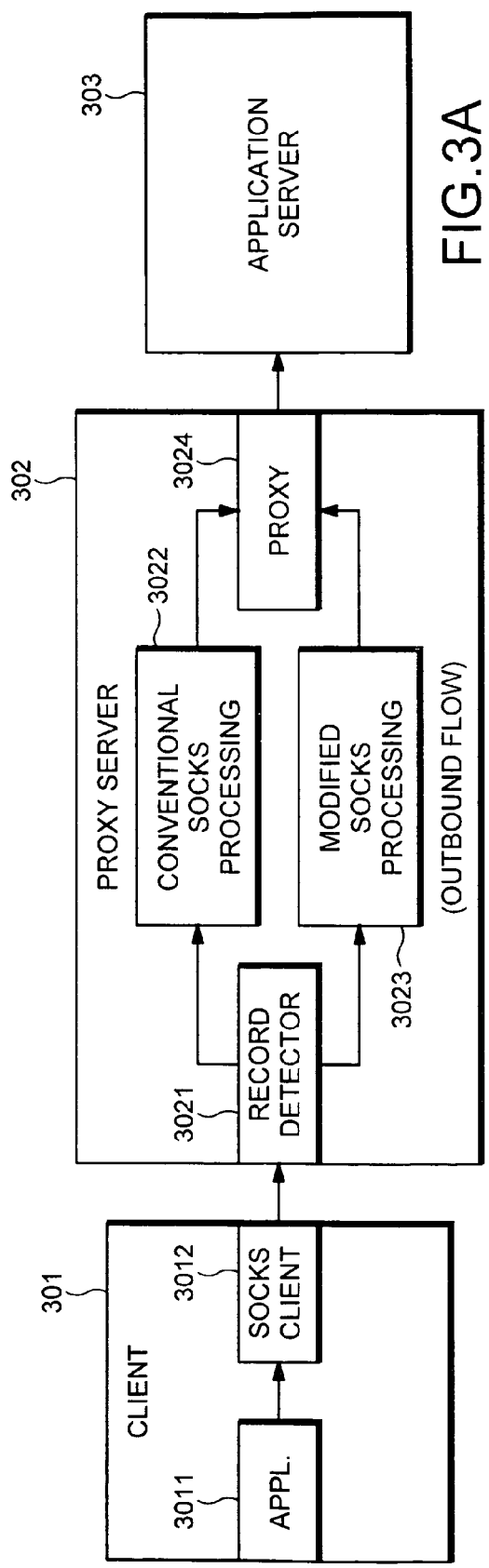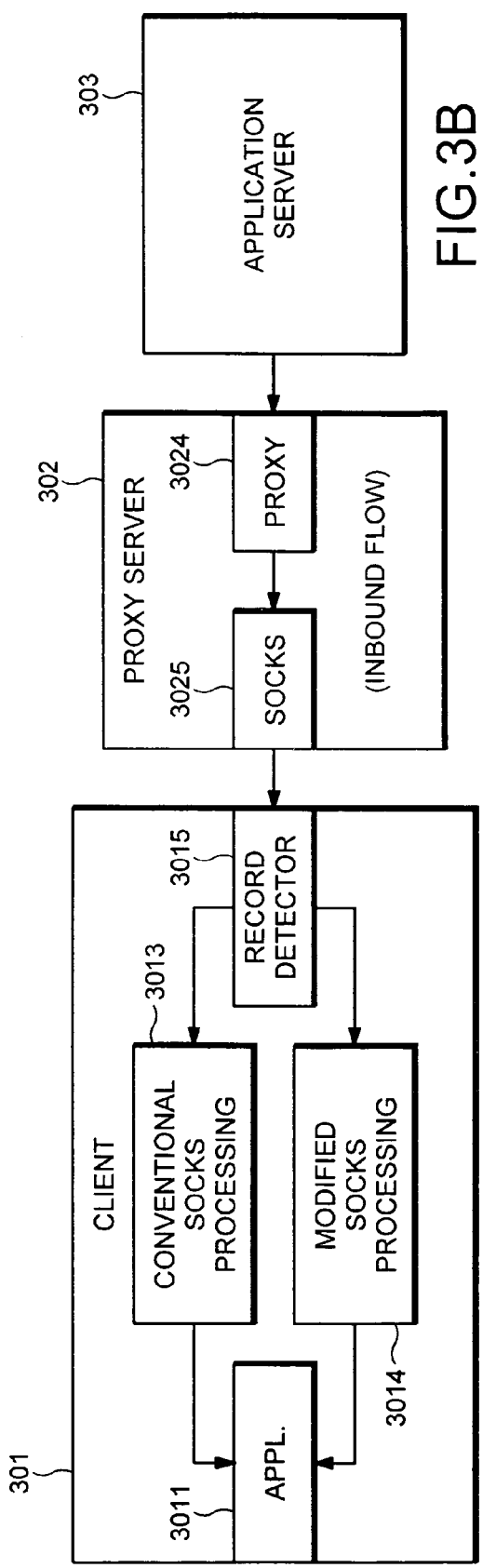

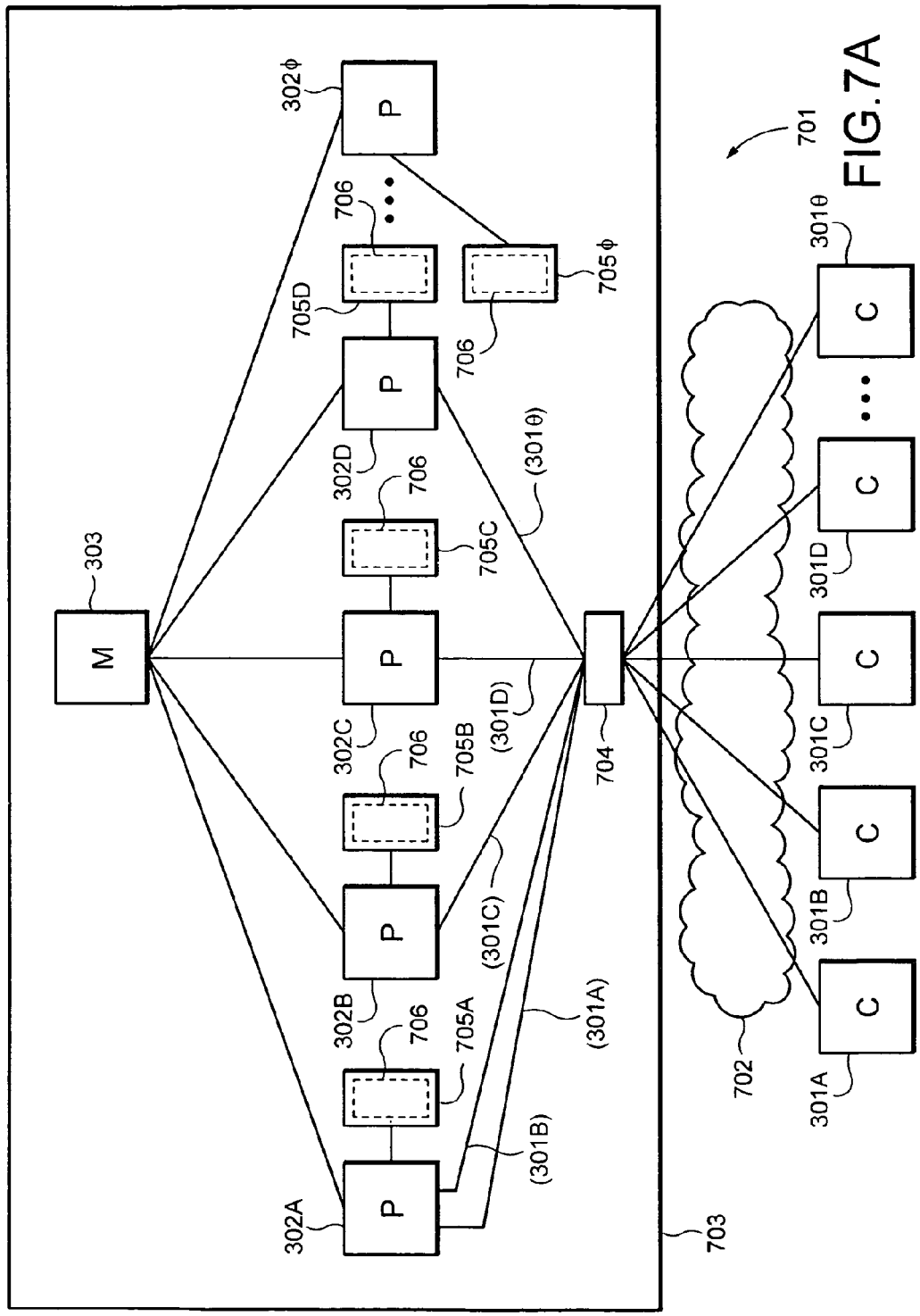

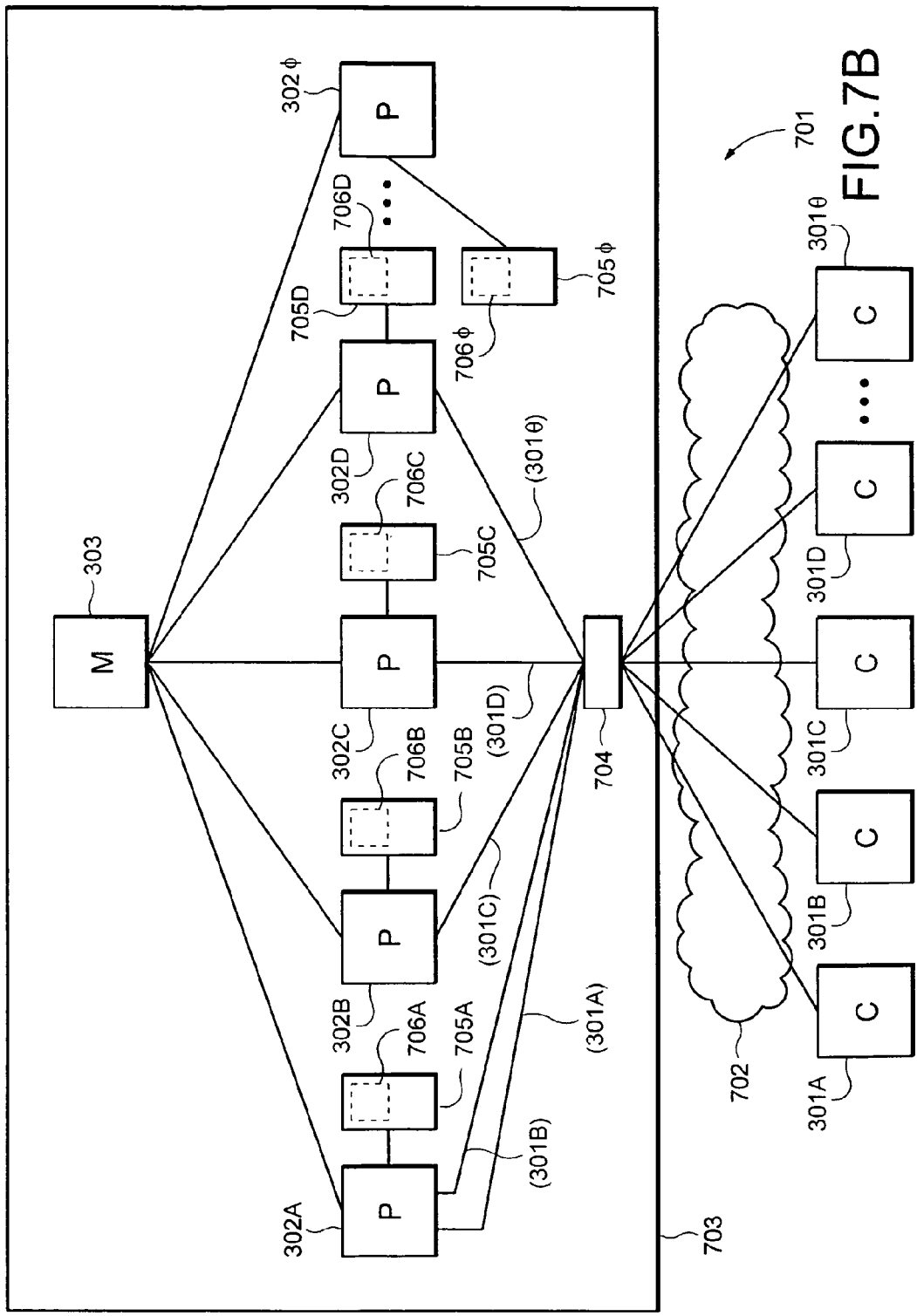

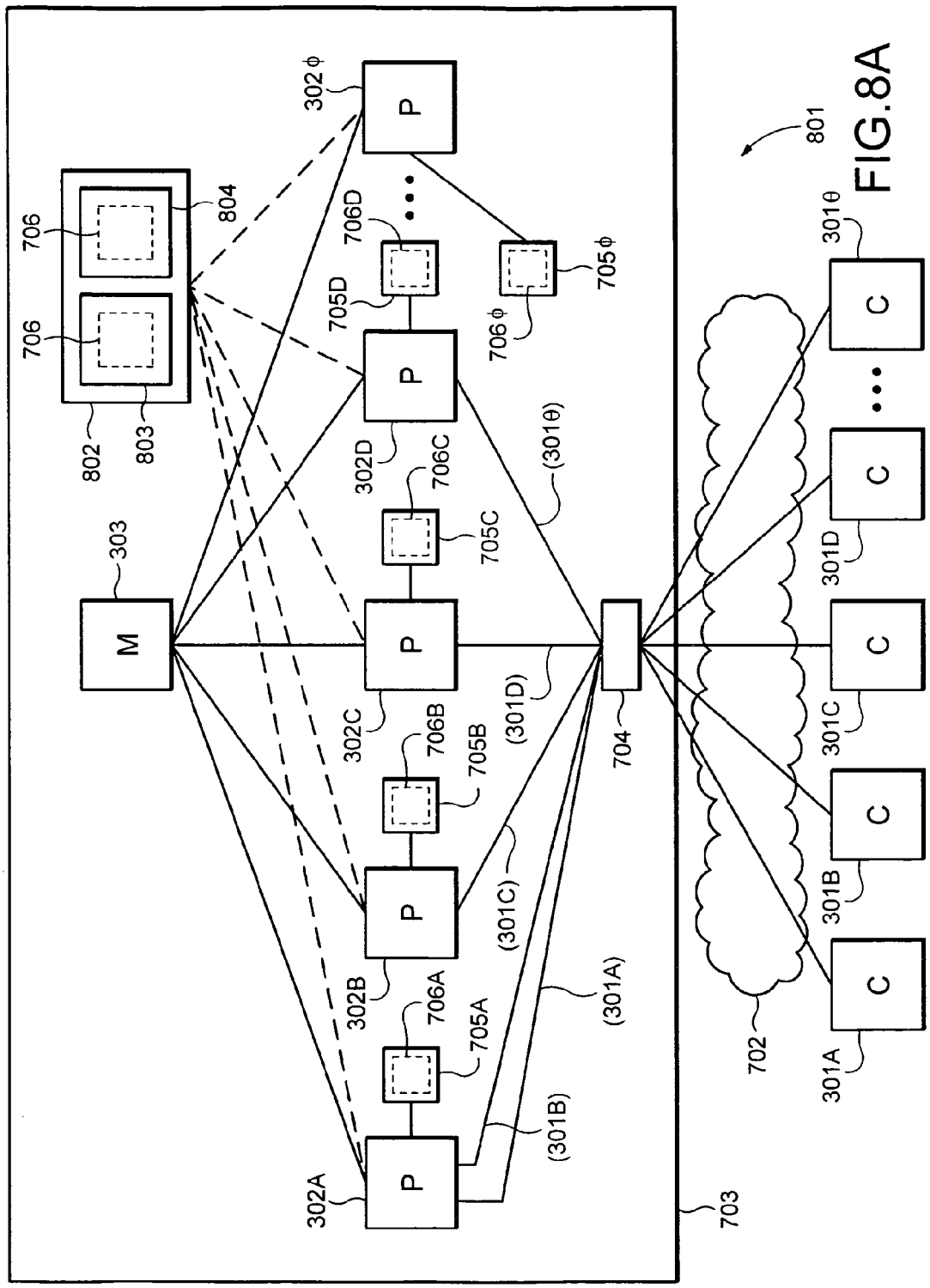

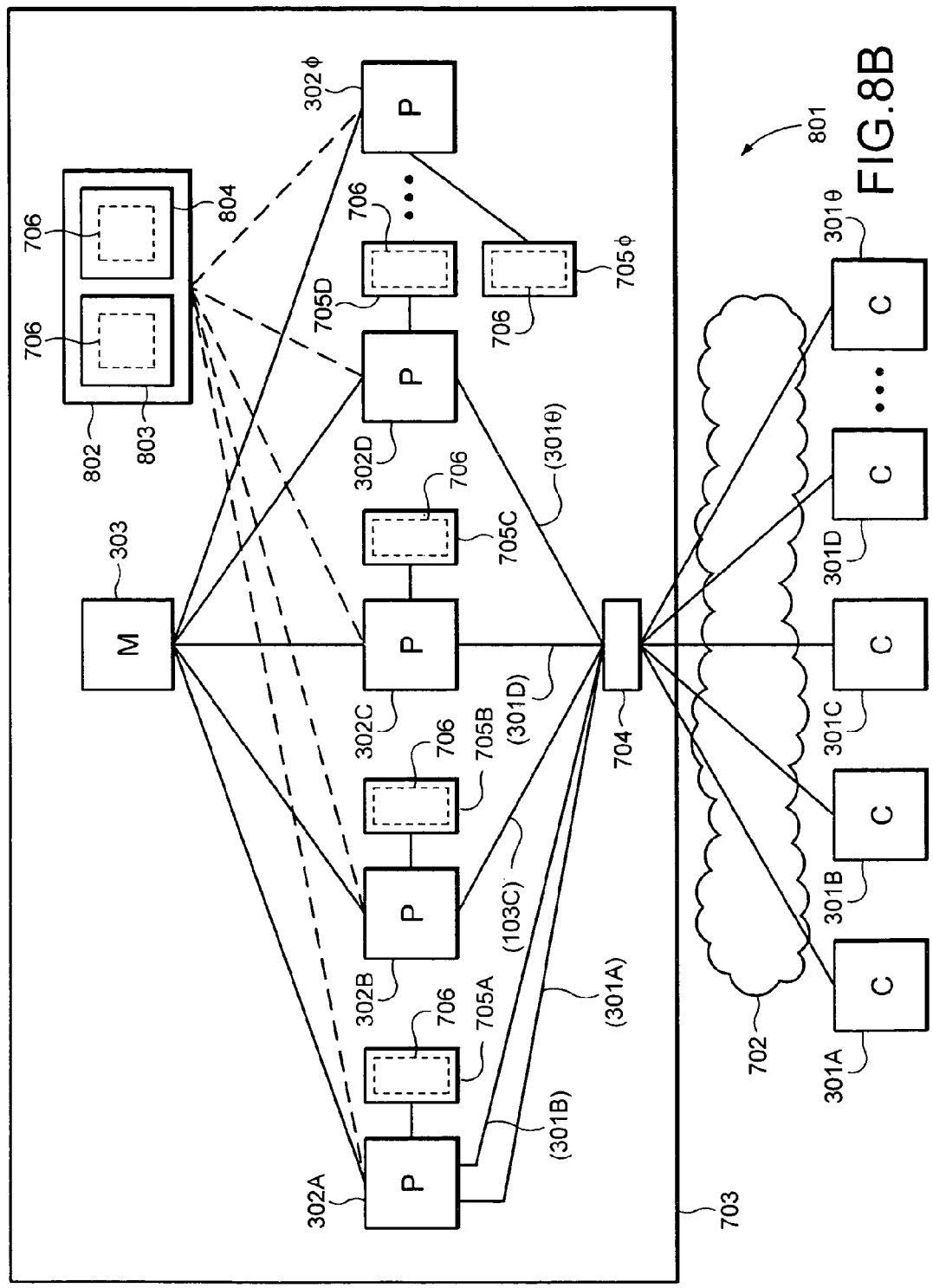

METHOD AND APPARATUS FOR PROVIDING SECURE STREAMING DATA TRANSMISSION FACILITIES USING UNRELIABLE PROTOCOLS

CROSS-REFERENCE TO RELATED APPLICATIONS

The present application is a continuation and claims the priority benefit of U.S. patent application Ser. No. 13/004,812 filed Jan. 11, 2011, now U.S. Pat. No. 8,533,457, which is a continuation and claims the priority benefit of U.S. patent application Ser. No. 11/927,362 filed Oct. 29, 2007, now U.S. Pat. No. 7,870,380, which is a continuation and claims the priority benefit of U.S. patent application Ser. No. 09/783,146 filed Feb. 13, 2001, now U.S. Pat. No. 7,360,075, which is a continuation-in-part and claims the priority benefit of U.S. patent application Ser. No. 09/782,593 filed Feb. 12, 2001, now U.S. Pat. No. 7,353,380, the disclosures of the aforementioned applications are incorporated herein by reference.

U.S. patent application Ser. No. 09/927,362 is also related to U.S. patent application Ser. No. 09/783,147 filed Feb. 13, 2011, now U.S. Pat. No. 7,383,329, which is incorporated herein by reference.

BACKGROUND OF THE INVENTION

1. Field of the Invention

This invention relates generally to data transmission schemes and protocols. More particularly, the invention provides a method and apparatus for securely transmitting data between two or more computer nodes using an unreliable protocol such as User Datagram Protocol (UDP). Moreover, the invention provides a method and apparatus by which a communication session with a computer using the secure transmission of the invention can be switched to another computer without having to generate a new session.

2. Description of the Related Art

The well-known Transmission Control Protocol/Internet Protocol (TCP/IP) has been used for many years to transmit data packets between computers. TCP provides a guaranteed delivery and ordering scheme for data packets, such that two or more computers using TCP can rely on the protocol to ensure that any given packet will reach its destination in the order in which it was transmitted. Internet Protocol (IP) generally provides a point-to-point packet transmission service without guaranteed delivery. FIG. 1A shows how an application program can be layered on top of TCP/IP according to a conventional protocol stack. The popular Hyper Text Transport Protocol (HTTP) relies on the existence of a TCP connection between a client's browser and a server computer in order to fetch and display web pages.

Although TCP provides guaranteed delivery capabilities using built-in mechanisms (i.e., each application need not concern itself with reliability details), one disadvantage of using TCP is that it can incur delays and other side effects when transmitting a stream of data. For example, if two computers use TCP to transmit a packetized video stream, the received packets may appear "jerky" because missing or dropped packets must be re-transmitted before they can be re-ordered into the received packet stream. Consequently, TCP is not a good candidate for streaming data, such as videoconferencing applications.

The well-known User Datagram Protocol (UDP) provides a packet-oriented transmission service for communicating between two computers, such as a client computer and a server computer. In contrast to TCP and other guaranteed-delivery protocols, packets transmitted using UDP are not guaranteed to arrive at the destination computer. Moreover, packets that are transmitted in a particular order may arrive at the destination computer out of order. Thus, UDP is termed an "unreliable" transport protocol. In contrast to TCP and other guaranteed-delivery protocols, however, UDP provides a more time-sensitive delivery scheme, making it more suitable for streaming media such as video data.

As applications such as videoconferencing have increased the importance of streaming media, a need has arisen to provide secure streaming transmission facilities. For example, many corporations need to transmit streaming video between a headquarters facility and one or more remote offices. The transmission may include sensitive information that the company needs to protect from unintended recipients or eavesdropping. Because neither TCP nor UDP provide such security, they may be insufficient in themselves for such transmissions.

In recent years, various attempts have been made to provide secure transmission facilities by enhancing guaranteed-delivery protocols with encryption techniques. For example, the Secure Sockets Layer (SSL) is a protocol that provides a secure channel between two machines, such as a server computer and a client computer. The secure channel is transparent yet encrypted between client and server, such that nearly any protocol that can be run over TCP can be run over SSL with only minimal modifications. Indeed, SSL/TLS security and fault detection rely on TCP (or a similar guaranteed delivery protocol) to order packets and guarantee delivery. After undergoing various revisions, SSL was renamed Transport Layer Security (TLS) and adopted by the Internet Engineering Task Force (IETF), as reflected in RFC 2246. (The term SSL/TLS will be used to refer collectively to these two closely related protocols). A principal application of SSL/TLS is on-line shopping, wherein consumers transmit sensitive credit card information using HTTP protocols and web browsers in a secure manner.

Because most Internet protocols operate over TCP connections, SSL/TLS provides a convenient scheme for securely transmitting data between two or more computers, such as a client computer and a server computer. FIG. 1B shows architecturally how an application can use SSL/TLS to transmit secure data over a reliable connection such as TCP. As is conventional, the steps for securely transmitting data using SSL/TLS generally include the following:

(1) a client establishes a TCP connection with a server computer;
(2) the client and server use SSL/TLS protocols to exchange credentials (including an SSL/TLS handshake; negotiation of protocol mechanisms; and establishment of per-connection keys); and
(3) each HTTP request (e.g., GET) is converted into an SSL/TLS record having encrypted content.

FIG. 1C shows a sample SSL/TLS record, which generally includes a header (HDR), encrypted data or ciphertext, and a MAC (Message Authentication Check). The MAC ensures message integrity by means of a keyed hash, similar to a strong checksum, and is generally calculated as a function MAC=h (key, plaintext, sequence number), where the sequence number is a one-up counter for successive records. The sequence number forms an important aspect of the MAC calculated by TLS, since it prevents so-called "splicing attacks" that could otherwise occur if a hacker attempted to intercept and re-order packets in an attempt to decrypt or disrupt secure communication between computers using TLS. If the recipient's TLS detects an incorrect sequence number for a received record, it will reject the record as an attempted breach and terminate the connection. This requires that the sender and recipient re-establish another TCP connection, which results in wasted time and resources.

Because of its transparent nature, any TCP-based protocols (e.g., HTTP, FTP, etc.) or any similar guaranteed delivery protocol can be operated over TLS. Further details of SSL and TLS are provided in a book entitled "SSL and TLS: Designing and Building Secure Systems," by Eric Rescorla, ISBN 0-201-61598-3, published by Addison Wesley.

Unfortunately, reliance on TCP or other guaranteed-delivery protocols renders SSL/TLS susceptible to the same performance problems that TCP incurs. For example, using SSL/TLS to transmit streaming video data incurs the same costs and penalties (e.g., "jerky" video) that the underlying TCP incurs. By its nature, SSL/TLS requires the use of a reliable connection such as provided by TCP, because they will terminate a connection if a packet is dropped or received out-of-order.

In recent years, a protocol known as Private Communication Technology (PCT) was proposed, although it was never commercially successful. PCT was an attempt to extend SSL to secure datagram traffic (using so-called "stream cipers"). For example, PCT used a different header format (4 bytes, 2 length and 2 record type) from SSL (5 bytes, 1 record type, 2 version number, 2 length). The handshaking message bodies also contained a different beginning format; PCT used 4 bytes (2 handshake type, 2 record flags), while SSL uses only 1 byte (handshake type). PCT datagram support used the following format:

> 2 bytes of key_length
> (key_length) bytes of key data
> (data_length) bytes of encrypted data
> (mac_length) bytes of MAC data, whereas SSL's datagram support is formatted as follows:

> (data_length) bytes of encrypted data
> (mac_length) bytes of MAC
> (padding_length) bytes of padding
> 1 byte of padding_length
> (nonce_length) bytes of nonce.

PCT specified a mechanism in which every datagram has a new encryption key created by hashing a master key with the ENCRYPTED_KEY.sub.-1_DATA (a random value is assigned to each record that is part of DK_ENCRYPTED_KEY_DATA).

The proposed PCT mechanisms imposed various performance tradeoffs. For example, although the PCT mechanism could be used with stream ciphers, it is likely to be much slower, because of additional hashing and key schedule creation to process every single record. In other words, it uses a different key for every datagram, which is computationally costly. Key schedule setup can be expensive for some block ciphers. Moreover, PCT did not provide a mechanism for integration with the SOCKS or other multiprotocol proxies.

Conventional wisdom states that UDP is not suitable for secure communications. The Rescorla book identified above, for example, specifically states that "UDP does not [provide reliable transport] and so SSL cannot be successfully run over UDP, because records might be arbitrarily lost or reordered, which would look like an active attack to the SSL implementation." Consequently, the prior art teaches away from using UDP in combination with SSL to transmit secure data. Yet UDP would be a good match for many streaming media applications, which can tolerate occasionally dropped data packets, but not delays that occur in TCP. For example, a videoconference that is broadcast in real-time can tolerate an occasionally missing video frame, but not the "jerkiness" that occurs when missing packets are retransmitted and reordered. Moreover, user session terminations occur frequently with standard UDP sent over standard SSL.

Some protocols rely on both TCP and UDP to transmit high-performance data, such as video or audio streaming. REALAUDIO, for example, is believed to use both TCP and UDP, wherein TCP is used for signaling (e.g., start/stop), while UDP is used to transmit data packets for the streaming content. However, the UDP datagrams are transmitted "in the clear," rendering them susceptible to interception or attack.

A protocol known as KERBEROS, used mainly in academic circles, provides security by encrypting UDP datagrams. The mechanism used by KERBEROS to provide datagram security is specified in RFC 1964. However, it is not compatible with SSL/TLS protocols, and thus has not found widespread use. One of the primary reasons that KERBEROS has not been commercially successful is that it is complex to operate, and not streamlined for widespread use in network processing. In particular, network-based security software must interoperate efficiently with web servers and proxy servers to control and secure user access. In general, simpler protocols have been favored for fast processing and distributed systems.

KERBEROS also uses separate encryption mechanisms, namely key establishment handshakes, to communicate secure UDP and TCP traffic. However, it may be desirable to reduce computational and network traffic overhead by integrating those under a single standard security protocol, such as SSL, running on a multiprotocol proxy server standard such as SOCKS. KERBEROS also adds a random key field for packet identification to extend the data record in a conventional manner, for purposes of initializing the encryption algorithm. However, this requires additional computation and network traffic as KERBEROS has a separate sequence number in the data record. It may be advantageous in some systems to have a single field serving both purposes.

UDP and SSL are standards in the software industry. UDP is used for processing datagrams, while SSL provides secure communication. At the same time, the adoption of multi-protocol proxy servers, such as those running the popular SOCKS protocol, provide a means for combining industry standard communications protocols such as TCP and UDP in one system. Until recently, it has not been possible to do so because of the incompatibility of UDP and SSL. To understand this problem and the limitations it creates for management of network communications under a single proxy server protocol such as SOCKS, it is first necessary to understand how SOCKS processes information.

The SOCKS protocol provides a generic proxying protocol for traversing firewalls and other boundaries. Version 5 of this protocol, described in IETF RFC 1928, provides features such as authentication and UDP support. FIG. 2 shows a conventional approach for connecting to a server through a firewall by means of a proxy server and the SOCKS protocol. As shown in FIG. 2, a client computer 201 communicates with an application server 203 through a proxy server 202. The system may include a firewall (not shown) that acts as an application-layer gateway between networks. Application server 203 typically offers TELNET, FTP, SMTP, and HTTP access. Client computer 201 includes an application 2011 (e.g., a web browser) and a SOCKS client 2012. Proxy server 202 includes a SOCKS server 2021 and a proxy function 2022. In accordance with SOCKS version 5, which provides security features, client application 2011 can obtain services from server 203 as follows.

First, client application 2011 makes a request to connect to server 203. Next, SOCKS client 2012 detects the requested connection, and is aware that communication with server 203 must be handled via proxy server 202. Consequently, SOCKS client 2012 sends a request to SOCKS server 2021 to establish a TCP connection. Proxy function 2022 establishes a connection with server 203, and all further communication between client application 2011 and server 203 goes through SOCKS server 2021 and proxy function 2022. As is conventional, SOCKS uses SSL/TLS to establish a secure connection with client 201, and may demand a password before permitting the connection to be established. The architecture of FIG. 2 restricts access to server 203 at a single point (e.g., proxy server 202) and carries some of the load of communicating with server 203 in a way that penetrates firewalls. Because they rely on SSL/TLS to provide security, the connections in FIG. 2 necessarily rely on TCP (or a similar guaranteed-delivery protocol).

The architecture of FIG. 2 can also be used to transmit nonsecure UDP datagrams. This scheme involves negotiating a UDP port "connection" between client 201 and proxy server 202, such that nonsecure UDP datagrams are transmitted through the port, whereas secure commands are transmitted over the secured SSL/TLS/TCP connection. Such a scheme has sometimes been referred to as "naked UDP" mode, reflecting the fact that the UDP datagrams are unsecure. A system employing this technique has been commercially available from Aventail Corporation of Seattle, Wash., for several years. In general, SOCKS client 2012 adds a SOCKS header to each record transmitted from client 201, which is stripped off by SOCKS server 2021 before being transmitted to server 203.

As described above, it is not possible to securely transmit UDP datagrams in the context of SSL/TLS, due to SSL/TLS's reliance on TCP to provide a reliable connection service. However, it would be advantageous to provide a secure UDP service in the scheme of FIG. 2, such that proxy server 202 could facilitate high-performance video streaming between client 201 and server 203 without compromising the security of the data. Consequently, one challenge is to find a way to operate both secure TCP and secure UDP through proxy server 202, preferably using SSL as the security layer and SOCKS as the multiprotocol proxy server. More generally, it would be desirable to find a way to retain compatibility with the SSL/TLS standard without incurring the overhead and disadvantages caused by their reliance on TCP.

In addition to being unable to be successfully run over UDP, the SSL/TLS protocols offer another drawback. In the example described above, the client device 201 initiates a secure protocol session with the proxy server 202 by completing a full SSL/TLS "handshake" with the proxy server 202. During this handshake, the client computer 201 and the proxy server 202 exchange SSL/TLS version numbers, cipher settings, session-specific data, authentication certificates, and other information that they need to communicate with each other using the SSL/TLS protocol. Using this information, both the client computer 201 and the proxy server 202 generate the same master secret key, which in turn is used to generate individual session keys. These session keys are symmetric keys used to encrypt and decrypt individual groups of information exchanged during the session, and to verify the integrity of exchanged information.

As will be appreciated by those of ordinary skill in the art, conducting a full SSL/TLS handshake to initiate a SSL/TLS session is time consuming and presents a heavy load on the network's resources, both in terms of network communication traffic and in processing time for the client device 201 and the proxy server 202. Once the proxy server 202 has received the required SSL/TLS session information in a full SSL/TLS handshake, however, the proxy server 202 may subsequently resume that SSL/TLS session with the client computer 201 using only a partial SSL/TLS handshake. Advantageously, the partial SSL/TLS handshake is much quicker and consumes less network resources than the full SSL/TLS handshake.

A problem with this arrangement occurs, however, if the connection between the client computer 201 and the proxy server 202 is terminated and the client computer 201 then tries to establish communication with the application server 203 through another proxy server 202. For example, the first proxy server 202 may have failed and be unavailable, or a load balancer may simply have routed the new connection from the client device 201 to the new proxy server 202 to reduce the communication load on the first proxy server 202. In any case, the new proxy server 202 will not have the SSL/TLS session information needed to resume the SSL/TLS session with the client computer 201. Accordingly, the client device 201 and the new proxy server 202 must conduct a full SSL/TLS handshake in order to create a new SSL/TLS communication session. This process is time-consuming, and may require a substantial amount processing time from both the client computer 201 and the new proxy server 202. Moreover, depending upon the state of the original session between the client device 201 and the proxy server 202, the loss of the previous session's state may be irreplaceable. For example, if the state of the earlier session was established by exchanging data that cannot be duplicated, then that session cannot be recreated.

To address this problem, some network systems attempt to ensure that a terminated connection between a client computer 201 and its associated proxy server 202 is reestablished with that original proxy server 202 rather than with a new proxy server device 202. For example, some systems design a load balancer to recognize when the client device 201 has established a session with a particular proxy server 202, and then route all future connections from the client computer 201 to that proxy server 202. This solution has a number of drawbacks, however. It requires that the load balancer be very complex and perform a variety of functions. Further, it does not address the situation that occurs if the initial proxy server 202 becomes unavailable, e.g., if it fails and simply cannot reestablish a connection with the client computer 201. It also does not address the situation where the first proxy server 202 becomes overloaded with connections to other client computers. In effect, this solution may prevent the load balancer from performing a load balancing function.

In view of the failure of conventional attempts to providing secure data transmission facilities without incurring the penalties and overhead inherent in reliable communication protocols, there exists a need to provide such facilities to support high-bandwidth applications such as secure videoconferencing. Moreover, there is a need to provide secure data transmission services while retaining compatibility with SSL/TLS. Further, there is a need for a network arrangement that will allow a client computer to switch between a communication connection with a first proxy server to a second proxy server while maintaining the state of a SSL/TLS session established between the client computer and the first proxy server. Preferably, such a network arrangement should permit such a switch from a connection with a first proxy server to a connection with a second proxy server even if the first proxy server becomes unavailable due to failure or other problems.

SUMMARY OF THE PRESENTLY CLAIMED INVENTION

The present invention overcomes the aforementioned problems by providing a method and apparatus for transmitting encrypted data over an unreliable protocol, such as UDP. In one variation, a special bit is set in data records which, when received by a proxy server, causes the records to be diverted to special processing. The special processing may include use of a nonce to detect the existence of repeat records and use of an initialization vector that permits the proxy server to decrypt a record without reference to data in any other record. Data records that do not have the special bit set are processed according to conventional SSL/TLS processing.

Further, the invention provides a network arrangement that employs a cache having copies distributed among a plurality of different locations. According to the invention, SSL/TLS session information for a session with any of the proxy servers is stored in the cache so that it is accessible to at least one other proxy server. Using this arrangement, when a client device switches from a connection with a first proxy server to a connection with a second proxy server, the second proxy server can retrieve SSL/TLS session information from the cache corresponding to the SSL/TLS communication session between the client device and the first proxy server. The second proxy server can then use the retrieved SSL/TLS session information to accept a session with the client device. According to some embodiments of the invention, identical copies of the cache are stored for each proxy server in the network arrangement, and each proxy server accesses its own copy of the cache to obtain necessary SSL/TLS session information. With other embodiments of the invention, a copy of the cache is maintained at a single source (e.g., a redundant set of cache storage devices) that is accessible to all of the proxy servers in the network arrangement.

Other features and advantages of the invention will become apparent with reference to the following detailed description and the figures.

BRIEF DESCRIPTION OF THE DRAWINGS

FIG. 1A shows a conventional approach for transmitting data packets using either TCP or UDP in combination with IP.

FIG. 1B shows a conventional approach for transmitting secure data using SSL/TLS in combination with TCP/IP.

FIG. 1C shows a conventional record format for SSL/TLS record, including a header field, an encrypted ciphertext field, and a message authentication check (MAC).

FIG. 2 shows a conventional approach for interfacing a client computer 201 to a server computer 203 through a proxy server 202 using the SOCKS protocol.

FIG. 3A shows a system employing a modified SOCKS protocol in an outbound flow direction according to one variation of the invention.

FIG. 3B shows a system employing a modified SOCKS protocol in an inbound flow direction according to one variation of the invention

FIGS. 7A and 7B illustrate two networks according to one embodiment of the invention.

FIGS. 8A and 8B illustrate two networks according to another embodiment of the invention.

DETAILED DESCRIPTION

Figure 4A:
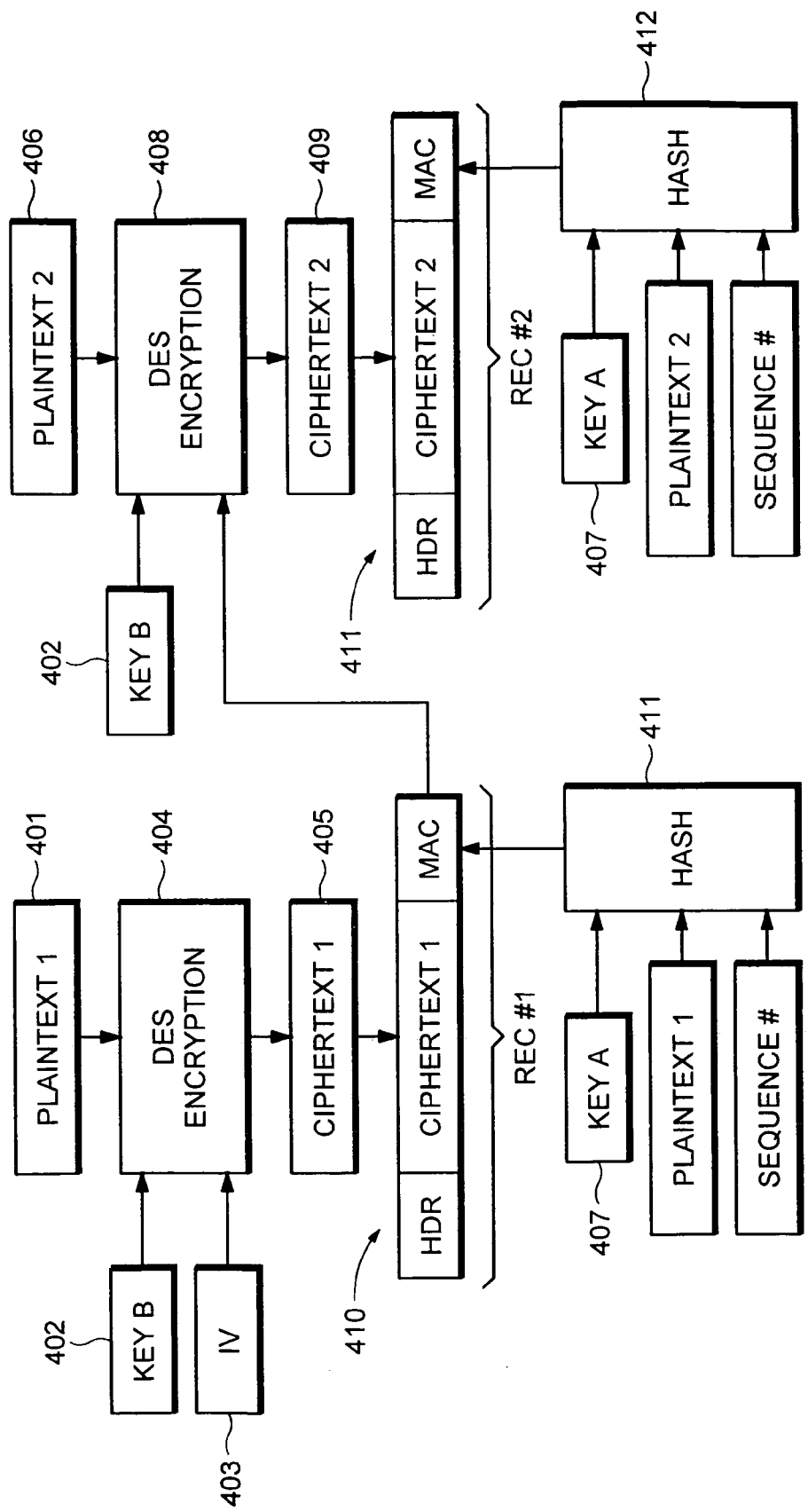
FIG. 4A shows a conventional technique for creating SSL/TLS records using encryption.

FIG. 3A shows a system employing a modified SOCKS protocol in an outbound (e.g., from client to application server) direction according to one variation of the invention. As shown in FIG. 3A, a client computer 301 communicates with an application server 303 through a proxy server 302. As in the conventional system of FIG. 2, the client computer includes a client application 3011 that communicates with a SOCKS client 3012. However, in contrast to the conventional system of FIG. 2, SOCKS processing is modified to perform additional and different functions from those in the system of FIG. 2, as described in more detail below. Application server 303 operates in the same manner as that described with reference to FIG. 2.

In contrast to the system of FIG. 2, proxy server 302 includes two types of SOCKS processing: a conventional SOCKS processing function 3022, and a modified SOCKS processing function 3023. Record detector 3021 receives server-bound records from SOCKS client 3012 and, depending on whether a particular bit has been set indicating that the records are "secure UDP" records, routes them through a software switch to either conventional SOCKS processing function 3022 or modified SOCKS processing function 3023. Details of modified SOCKS processing function 3023 are provided below.

The architecture shown in FIG. 3 allows proxy server 302 to operate either with conventional SOCKS clients such as SOCKS client 2012 of FIG. 2, or with SOCKS clients that have been modified to operate in accordance with the principles of the present invention (modified SOCKS client 3012), which uses unreliable protocols such as UDP to transmit encrypted data. Moreover, both types of clients can be simultaneously accommodated. In one embodiment, both UDP and TCP protocols can be operated on the same proxy server. Further details of the modified processing are provided below. Proxy function 3024 operates essentially in the same manner as proxy function 2022 of FIG. 2.

There are many variations on the architecture of FIG. 3 that fall within the inventive principles. As one example, record detector 3021 can be optional. As another example, if client 301 and proxy server 302 agree during an initialization sequence that all subsequent UDP datagrams between them will be transmitted according to a modified encryption scheme as described herein, it may not be necessary to flag and evaluate each record to determine whether it conforms to one protocol or the other. It is of course also possible to implicitly designate the record type by way of other fields, such that the type of record (and resulting processing) will be evident from the other fields. Of course, as with "naked UDP," a secure TCP message can be combined with the present invention to contain keys or other encryption records in support of secure UDP. Moreover, the functions of proxy server 302 can be incorporated into server 303 or another computer, rather than requiring a separate proxy server to implement these functions. Finally, it will be apparent that encrypted records can be transmitted from client computer 301 to proxy server 302 and vice versa, such that a bi-directional secure communication path is established.

FIG. 3B shows the system of FIG. 3A for an inbound (e.g., from server to client) flow direction. Records that are received through proxy function 3024 are forwarded to SOCKS processing function 3025, which forwards them to a client-side record detector function 3015. Record detector 3015, in response to detecting records having a secure UDP bit set, routes such records to modified SOCKS processing function 3014, and otherwise sends them to conventional SOCKS processing function 3013. It will be appreciated that the various SOCKS processing functions can be located in client 301, proxy server 302, or another computer without departing from the inventive principles.

FIG. 4A shows a conventional technique for creating SSL/TLS records using encryption. Before explaining how the encryption principles of the present invention are applied, it is first necessary to briefly review how SSL/TLS performs encryption and decryption.

As shown in FIG. 4A, a first byte of plaintext 401 is encrypted using an encryption function 404, such as the conventional Data Encryption Standard (DES). A session encryption key 402 that is shared between the sender and recipient (e.g., SOCKS client 2012 and SOCKS server 2021) and an initialization vector (IV) 403 are input to the encryption function 404, and the resulting encrypted ciphertext 405 is produced. In accordance with the SSL/TLS standard, this ciphertext is embedded in a record 410 including a header and a MAC that is generated via hashing function 411 as a function of key 407, the plaintext, and a sequence number that is incremented for each record. The resulting record 410 is transmitted to proxy server 302 over a TCP connection previously established as part of the initial handshaking between client 301 and proxy server 302. The first initialization vector 403 can be agreed-upon between the sender and recipient during initialization.

In accordance with the SSL/TLS standard, the next plaintext 406 is encrypted using the same key 402, but using ciphertext 405 generated from the previously transmitted record as the second initialization vector. This creates a "link" between successive records, such that if the link is broken (e.g., a packet is lost or corrupted), the scheme will fail.

Figure 4B:
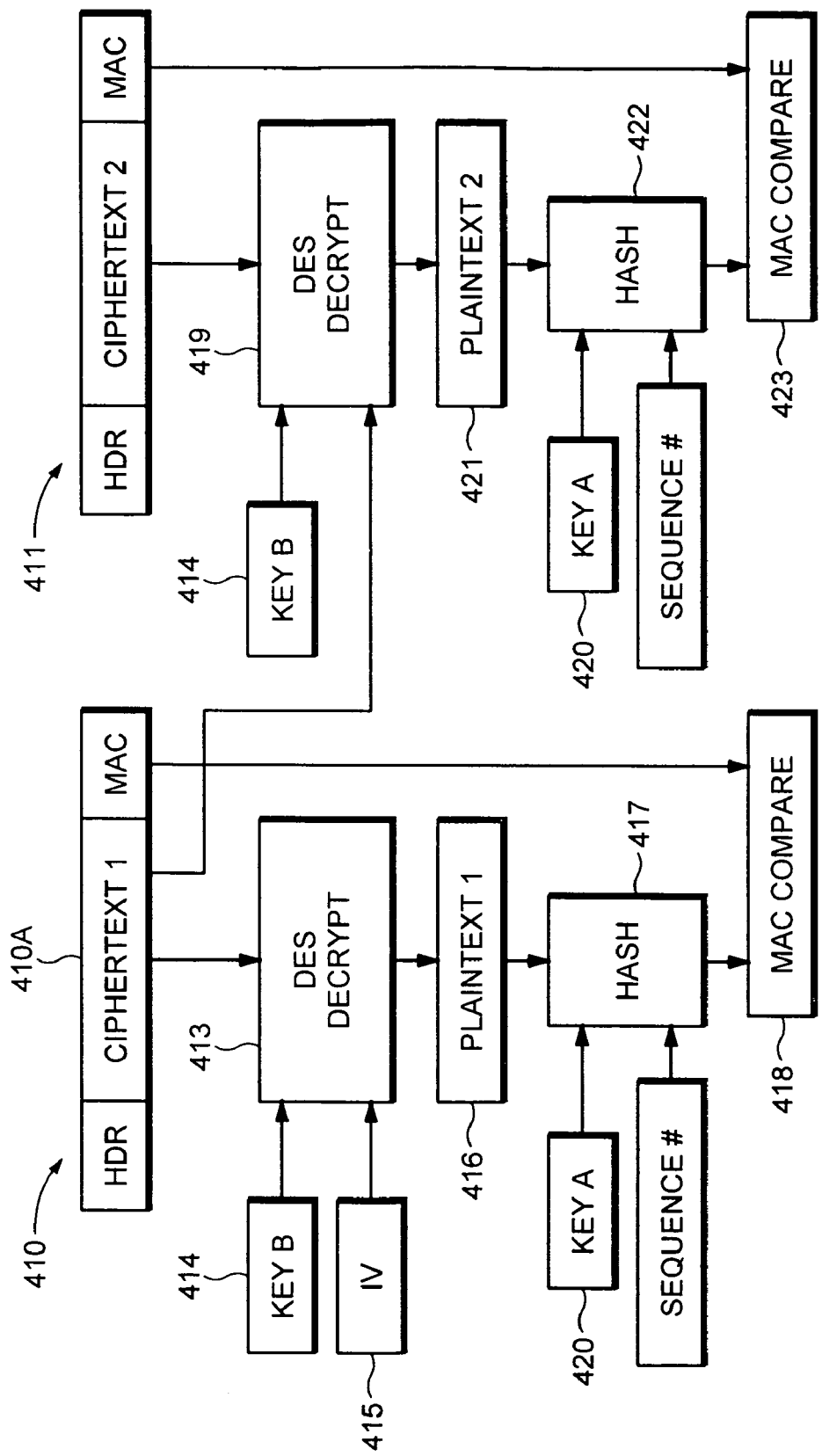
FIG. 4B shows a conventional technique for decrypting SSL/TLS records in reliance on previously decrypted records.

FIG. 4B shows the inverse process at the receiving end. At the recipient end (e.g., proxy server 202), first record 410 is decrypted as follows. The ciphertext is decrypted in decryption function 413 using a previously shared session key 414 and a previously shared initialization vector 415. The plaintext is used in a hash function 417 in combination with key 420 and one-up sequence number (independently incremented by the recipient) to generate a MAC that should match the MAC of the incoming record. If the MAC does not match, the record is discarded.

The second (and subsequent) incoming record 411 is decrypted using session key 414 but, instead of initialization vector 415, ciphertext 410A is used as the initialization vector. This matches the counterpart encryption scheme shown in FIG. 4A. As described above, if the recipient did not receive record 410 (or it was received out-of-order), the decryption will not occur properly due to reliance on the "chained" initialization vectors needed for decryption. The error will be detected by MAC comparison function 423, since the decrypted plaintext 421 will not produce a MAC that matches the MAC in the incoming record.

As explained above, the conventional SSL/TLS reliance on previously transmitted data records requires that the underlying packet transmission mechanism be completely reliable. This is referred to as "cipher block chaining," and it requires reliable transmission of records because each successive data record is encrypted in reliance on the previously generated record (with respect to DES, cipher block chaining is defined by FIPS 81). Consequently, if a record is received out of order or a data record is dropped, the encryption scheme will break down, and the sequence numbers will not match. If this happens, according to the conventional SSL/TLS scheme, the TCP connection will be terminated and a new connection will be required to re-establish data transmission. This security feature is intended to thwart hackers from interfering with the secure transmission scheme by inserting or manipulating data records between the client and proxy server. As explained above, if UDP or another unreliable protocol were used to transmit the data according to the scheme of FIG. 4, any missing or mis-ordered records would immediately cause the connection to be lost. Note that for the purposes of simplification, only a single block of ciphertext is shown in record 410 of FIG. 4. In practice, multiple blocks can be included in a single record, and the "cipher block chaining" can be performed between successive blocks in the single record.

Figure 5A:
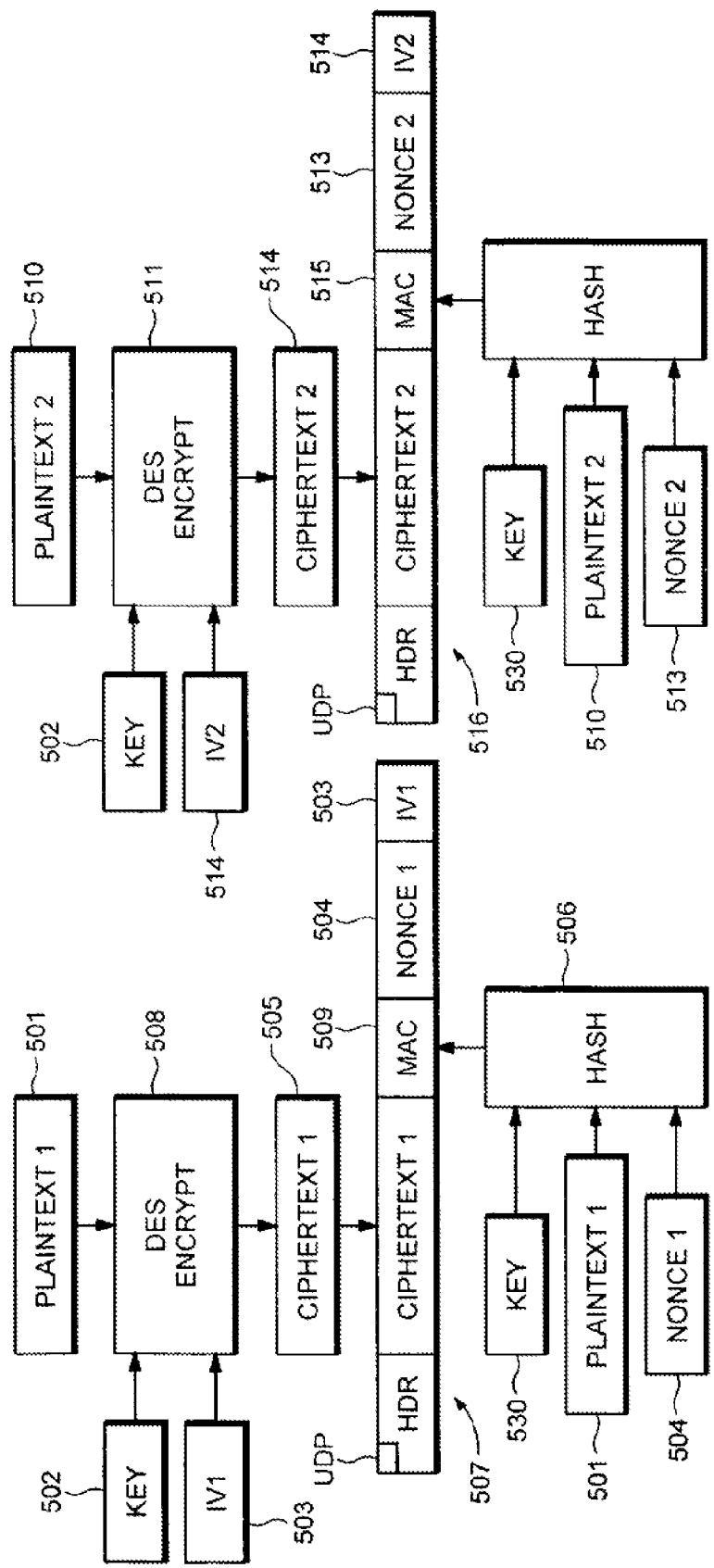
FIG. 5A shows a modified encryption scheme according to one variation of the invention, wherein each record is encrypted independently of a previously transmitted record.
Figure 5B:
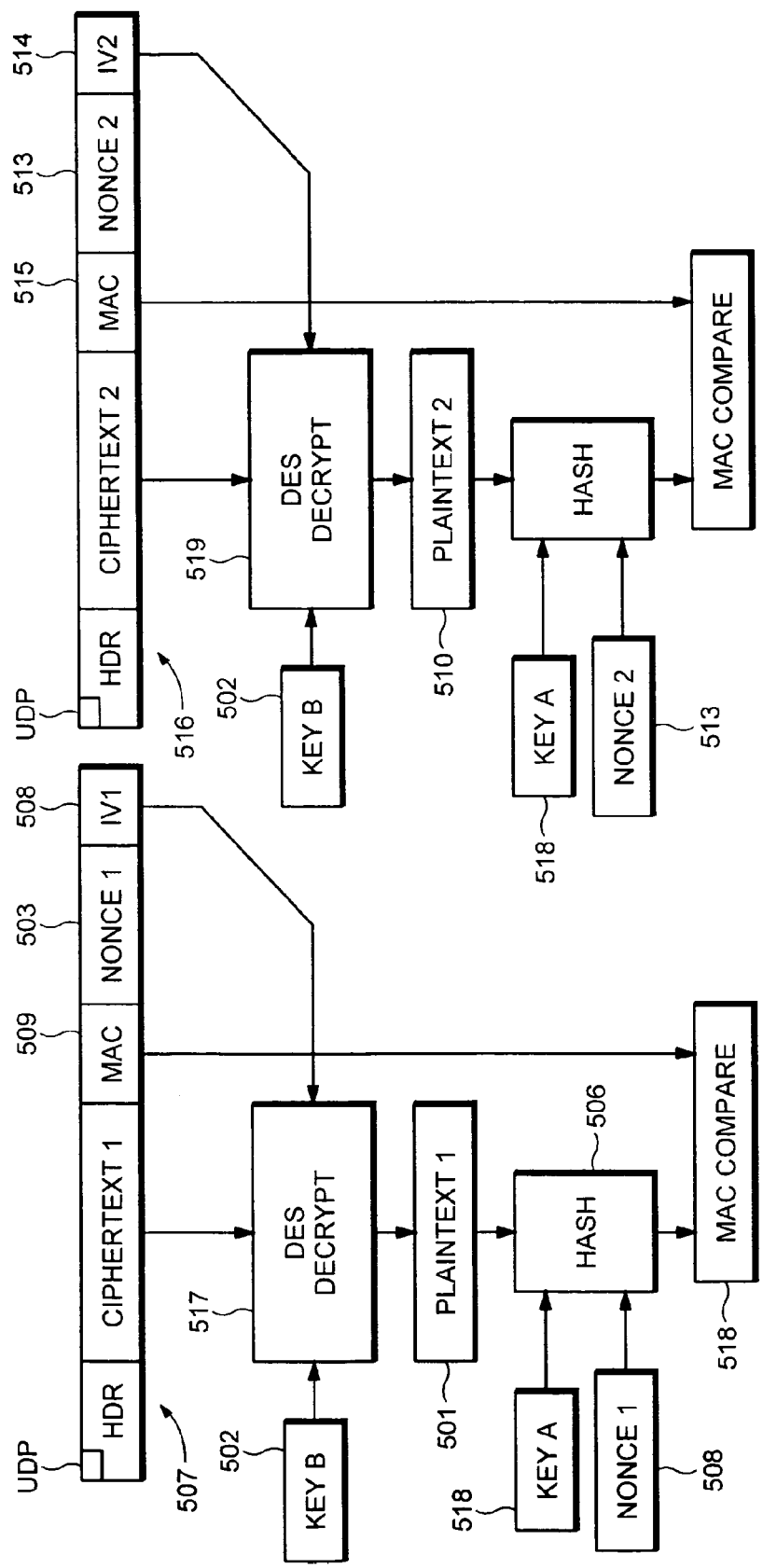
FIG. 5B shows a modified decryption scheme according to one variation of the invention, wherein each record is decrypted independently of a previously received record.

FIGS. 5A and 5B show a modified encryption and decryption scheme that can be used according to one variation of the present invention. In accordance with this variation, a slightly modified SSL/TLS record format 507 is used. A special bit (UDP) is embedded in the conventional header to indicate that the record contains encrypted UDP data and should be processed according to modified SOCKS processing function 3023. This bit can be used by record detectors 3021 and 3015 to determine whether any given SSL/TLS record should be routed to conventional SOCKS processing function 3022 or 3013, or to modified SOCKS processing function 3023 or 3014. This feature allows the principles of the invention to be applied with systems that conform to the existing SSL/TLS/SOCKS protocol, while also allowing enhanced security provisions to be used when UDP datagrams are transmitted.

As shown in FIG. 5A, plaintext 501 is encrypted using an encryption function 508, such as the conventional DES encryption algorithm. The encryption is performed using a shared session key 502 and a first initialization vector 503, resulting in ciphertext 505, which is used to create a modified SSL/TLS record 507. Plaintext 501 is also used in combination with different key 530 and a first nonce value 504 to create a MAC 509 using hashing function 506. In contrast to the encryption scheme of FIG. 4A, the record 507 includes nonce value 504 and initialization vector 503, which may comprise any preferably unique value (e.g., random numbers). According to one embodiment, a combined nonce/IV value is generated using a strong random number generator (e.g., one defined by the X9.62 standard, produced by the commercially available RSA BSAFE CRYPTO-C function).

In contrast to conventional SSL/TLS schemes, the nonce/IV value is explicitly included as part of each record so that the record can be decrypted without reliance on a previously transmitted record. In certain embodiments, the sequence number and initialization vector can be combined into a single value (the nonce), which can be an arbitrary or randomly generated number. In one embodiment, the nonce is the same size as the sequence number in SSL (e.g., 8 bytes), and each value is unique (i.e., the recipient can check them against a list of previously received records). The initialization vector may comprise the same size as a block of cipher (e.g., 8 bytes), and each value can be unique. In one variation, it may be desirable to create a large Hamming distance between difference initialization vectors (e.g., random numbers where each bit has a 50% chance of changing). Instead of appending separate nonces and initialization vectors, a combined nonce/IV value can be used. A cryptographically strong random-number generator can be used to generate such numbers, such as the RSA B SAFE CRYPTO-C product sold by RSA Security, Inc.

On the right side of FIG. 5A, plaintext 510 is encrypted in a similar manner, and a separate nonce 513 and initialization vector 514 is used to created data record 516.

Turning to FIG. 5B, the decryption of records 507 and 516 will now be described. The ciphertext from record 507 is decrypted using shared session key 502 and the initialization vector 508 extracted from the data record, to produce plaintext 501. The plaintext is fed through a hash function with key 518 and the nonce 508 extracted from the data record, to produce a MAC that can be compared with the MAC 509 extracted from the record.

The second record 516 is decrypted in a similar manner, except that it does not rely on values in the previously transmitted record 507 to perform decryption. In this manner, dropped or mis-ordered records can still be handled.

Figure 5C:
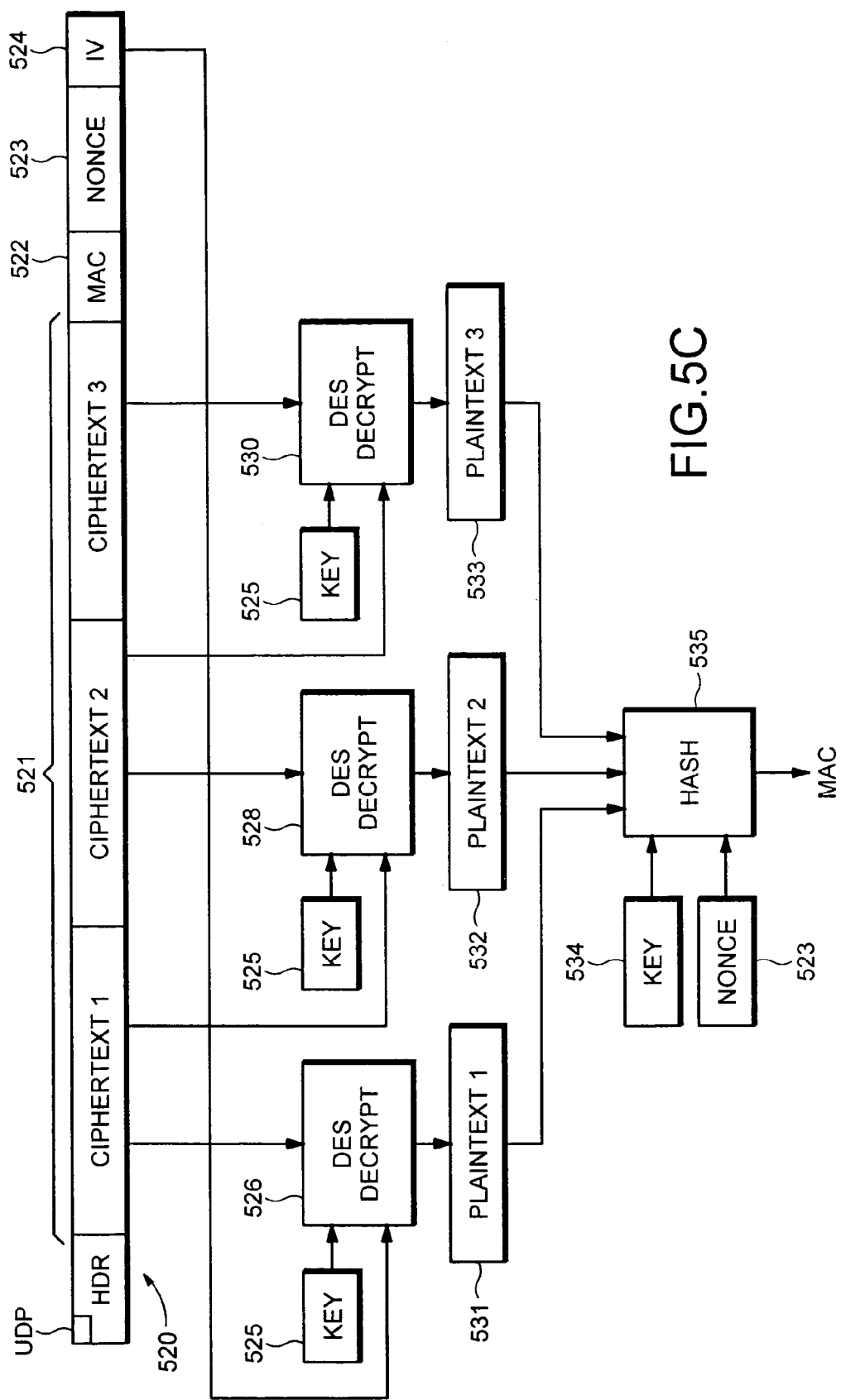
FIG. 5C shows a modified decryption scheme including multiple cipher blocks within a single record.

According to a variation of the invention illustrated in FIG. 5C, multiple cipher blocks 521 can be included in a single record, and the ciphertext for each block can be decrypted with reference to the previous cipher block. The first ciphertext is decrypted in decryption function 526 using initialization vector 524, whereas successive ciphertext blocks are decrypted using the ciphertext of the previous block (generally, encryption would operate in an inverse manner). A single MAC value can be calculated on the basis of concatenated plaintext blocks 531, 532, and 533.

As described above, the nonce and IV can be combined into a single value, such that the same value is used both as an IV and as a unique identifier for MAC calculation.

In one variation, the explicitly transmitted nonce is used to determine whether a previously received record has been received a second time. If so, the protocol optionally terminates the connection or generates a warning, since such a situation might be indicative of a hacker attack by so-called "replaying" packets." Note that the latter is different from conventional SSL/TLS, which terminates the connection if a sequence number is received out of order. Moreover, in certain embodiments the sequence number checking can be disabled or not used.

According to one aspect of the present invention, in contrast to conventional SSL/TLS, initialization vectors are not chained across records. Each record includes a unique initialization vector, and ciphertext blocks are chained together within a record as is conventional.

The use of a special UDP bit is only one technique for identifying records as conventional or modified SSL/TLS records. In one embodiment, no bit at all is needed, and the assumption is made that every record conforms to the modified SSL/TLS protocol as described herein. In other embodiments, different flags or methods can be used to signify that a particular record should be processed according to the modified scheme set forth above. As one example, during the initial handshaking that occurs between client and proxy server, a message can be sent indicating that subsequent records will be received according to the aforementioned protocol. In another embodiment, secure TCP can be used to exchange a set of MAC or IV values, equivalent to the nonce, for comparison and identification of the data record.

It should also be recognized that unreliable protocols other than UDP can be used to carry out the inventive principles, and the invention is not limited to UDP datagrams. Moreover, it should be appreciated that other encryption algorithms other than DES (e.g., AES) could be used, and the invention is not limited in this respect.

Figure 6:
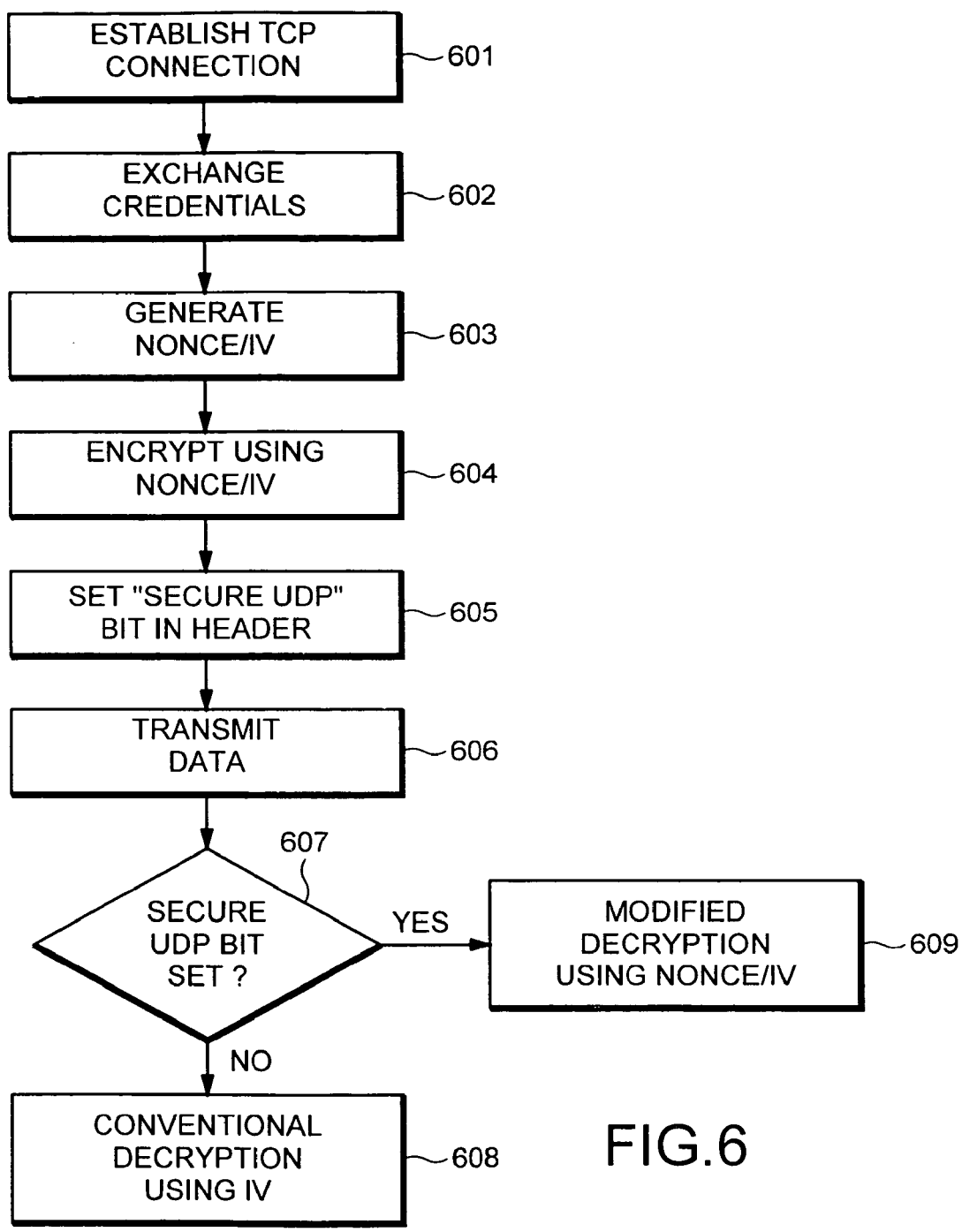
FIG. 6 shows various steps of a method that can be used to create and transmit encrypted records according to various principles of the invention.

FIG. 6 shows various steps of a method that can be used to practice the principles of the invention. Note that the use of proxy server 302 is entirely optional, and the functions illustrated therein can of course be implemented in client computer 301, server computer 303, or another computer. Alternatively, the inventive principles can be practiced using any protocols that provide unreliable packet transmission (e.g., Internet Protocol), even without the constraints of the SOCKS protocols. While the examples given above reflected transmission of secure UDP data client 301 to server 303, the example in FIG. 6 assumes that server 303 transmits UDP datagrams to proxy server 302, which encrypts them and sends them to client 301.

Assume that a client wants to receive secure video data from an application server using the architecture shown in FIG. 3B. That is, server 303 will transmit a stream of unreliably transmitted data using UDP to client 301 through proxy server 302, which will ensure that the records are sent in encrypted form to client 301. Beginning in step 601, the client and proxy server establish a TCP connection. This step is conventional, and conforms to the SOCKS protocols. In step 602, the client and proxy server exchange credentials (e.g., they negotiate security parameters) according to conventional SSL schemes. In one variation of the invention, client 301 and proxy server 302 also agree that UDP datagrams will be transmitted in encrypted form according to the principles described above. This can be done by transmitting a TCP packet (new) indicating that secure UDP datagrams will be transmitted using a particular port. The client can also send the server information regarding the target application server (e.g., IP address and port). Note that although steps 601 and 602 are described as being performed using a reliable protocol, they can of course be implemented using an unreliable protocol, as long as the information needed for the encryption steps can be shared or communicated between computers in some manner.

In step 603, a nonce/IV is generated, using for example a random-number generator. In step 604, a UDP datagram received from server 303 is encrypted using the nonce, and the other fields shown in FIG. 5 are generated as required. For example, each block of ciphertext can be chain-blockencrypted using the plaintext from the previous byte as the initialization vector, and the MAC can be generated as is conventional. Moreover, the nonce can be appended to the record as illustrated in FIG. 5.

In step 605, a "secure UDP" bit is set in the record header to indicate that the record has been encrypted according to the modified SSL/TLS/SOCKS protocol. As explained above, this bit is optional, since the encryption information can be indicated in various other ways. Finally, in step 606, the record is transmitted from proxy server 302 to client 301. In step 607, the record is received in record detector 3015 and, if the secure UDP bit is set, the record is decrypted in step 609 according to the modified SOCKS processing outlined above. Otherwise, in step 608 the record is decrypted according to conventional SOCKS processing.

Thus has been described a system and methods for transmitting data securely using an unreliable protocol, such as UDP. The invention can be used in a wide variety of systems and applications, including videoconferencing; streaming media (including audio, video, or both); bulk transfers of files; computer games over the Internet (including near-realtime gaming systems); Internet telephony; cellular telephone transmission; wireless LANS; and other system. The invention can provide advantages in the form of lower power consumption and less computer processing because the use of the inherently less complex and unreliable communication protocols (e.g., UDP, IP, and others) reduces the overhead and processing needed to transmit data securely. The invention can be used not only for communicating over the Internet, but for use in other computer networks, such as local area networks (e.g., Ethernet), peer-to-peer networks, and the like. It is also suitable for securing various data types, including nonstreaming media, although its principal application is with UDP traffic for streaming media.

One network arrangement 701 in which embodiments of the invention can be employed is illustrated in FIG. 7A. The network 701 shown in FIG. 7A includes a number of client computers 301A, 301B, 301C, 301D . . . 301Θ and a plurality of proxy servers 302A, 302B, 302C, 302D . . . 302.Φ, each of which is connected to an application server 303. Also, a connection from each client computer 301 is carried through a communication medium 702 through a firewall 703 to a load balancer 704, which then routes communications from each client computer 301 to one of the proxy servers 302A, 302B, 302C, 302D . . . 302Φ for relay to the application server 303. As previously noted any of the server and client computers can be implemented on a single computing unit or distributed across multiple computing units. Also, multiple client and/or server devices may be implemented on a single computing unit.

While only the single application server 303 is shown in FIG. 7A for ease of understanding, the network 701 can include a number of application servers 303, each communicating with a number of proxy servers 302 simultaneously. The number of client computers 301 communicating with each proxy server 302 in the network 701 could be, for example, more than 100. Similarly, the network could include a large number (e.g., in excess of 100) of proxy servers 302A, 302B, 302C, 302D . . . 302Φ communicating with each application server 303. The communication medium 702 may be any suitable medium. For example, if the client computer 301A is configured to communicate with the proxy server 302A using a Web-based communication program (e.g., a browser), then the communication medium 702 may be the Internet. Alternately, if the client computer 301D is configured to communicate with the proxy server 302B using a remote dial-up communication program, then the communication medium 702 may be a direct plain old telephone system (POTS) connection.

In this example, the client computers 301A, 301B, 301C, 301D . . . 301Θ communicate with the plurality of proxy servers 302A, 302B, 302C, 302D . . . 302Φ using either a conventional SSL/TLS process for reliable communication protocols or the modified SSL/TLS process for unreliable communication protocols described in detail above. As will become apparent from the following description, the network arrangement 701 allows a secure SSL/TLS session connection from a client computer to a proxy server be switched to another proxy server without having to generate a new SSL/TLS session, for both sessions using the conventional SSL/TLS procedure and the modified SSL/TLS procedure for unreliable protocols discussed above.

Each of the proxy servers 302A, 302B, 302C, 302D . . . 302Φ in the network 701 includes a cache memory 705. According to the invention, each of the cache memories 705A, 705B, 705C, 705D . . . 705Φ contains a copy of a cache 706. The cache 706 then contains a collection of SSL/TLS session information based upon the various SSL/TLS communication sessions between the multiple client computers 301A, 301B, 301C, 301D . . . 301Θ and the multiple proxy servers 302A, 302B, 302C, 302D . . . 302Φ. For example, the cache 706 contains SSL/TLS session information corresponding to the SSL/TLS session between the client computer 301A and the proxy server 302A.

SSL/TLS session information for a SSL/TLS session preferably includes all of the information necessary for a proxy server 302 to resume that SSL/TLS session with a client computer 301 without having to generate a new SSL/TLS session. For example, the SSL/TLS session information may include all of the information needed for a proxy server 302 to resume a SSL/TLS session with a client computer 301 with only a partial SSL/TLS handshake operation. Thus, the SSL/TLS session information should include the master secret key used to generate session keys for encrypting and decrypting data exchanged during the session. For various embodiments of the invention, the SSL/TLS session information should also include the peer certificate used to authenticate the client computer 301 and/or the user of the client computer 301.

In addition, the SSL/TLS session information may include a session identifier to identify the session (e.g., an arbitrary byte sequence chosen by the proxy application 901 to identify an active or resumable session), a cipher specification, specifying the bulk data encryption algorithm (such as null, DES, etc.), the message authentication check (MAC) algorithm (such as MD5 or SHA), and the cryptographic attributes (such as the hash size) used by the client computer 301 and the proxy application 901. Still further, the SSL/TLS information may include the algorithm used to compress data prior to encryption, and flag information indicating whether or not the session can be used to initiate new connections.

It should be noted that the term SSL/TLS session as used herein refers to both sessions generated using the conventional SSL/TLS processes for reliable communication protocols and the modified SSL/TLS processes for unreliable communication protocol discussed above. Of course, in order to allow a proxy server 302 to resume a SSL/TLS session without generating a new SSL/TLS session, the SSL/TLS session information may also include information specific to the type of SSL/TLS technique employed to originally generate the session. Thus, if the SSL/TLS session was generated using the modified SSL/TLS process for unreliable communication protocol discussed above, the SSL/TLS session information may also include data (e.g., a flag) indicating an agreement between the client computer 301 and the proxy server 302 that all subsequent records exchanged during the session will be processed according to the modified SSL/TLS process.

Accordingly, each cache 706 stores the information necessary to resume the SSL/TLS sessions (generated by both the convention SSL/TLS process or the modified SSL/TLS process described above) between the multiple client computers 301A, 301B, 301C, 301D . . . 301Θ and the multiple proxy servers 302A, 302B, 302C, 302D . . . 302Φ. The cache 706 thus includes the SSL/TLS information necessary to resume the SSL/TLS session between the client computer 301A and the proxy server 302A. Because each proxy server 302 has copy of the cache 706 in its associated cache memory 705, if the connection between the client computer 301 and the proxy server 302A is terminated, the client computer 301A can establish a new session with any of the other proxy servers 302B, 302C, 302D . . . 302Φ with the same SSL/TLS session information as the earlier session between the client computer 301A and the proxy server 302A.

In one embodiment of the invention, each cache memory 705A, 705B, 705C, 705D . . . 705Φ contains a complete copy of the cache 706. As each proxy server 302 obtains new SSL/TLS session information for a new session with a client computer 301, or updated SSL/TLS session information for an existing session with a client computer 301, the proxy server 302 sends the new or updated SSL/TLS session information to each copy of the cache 706 for storage.

The network 701 embodying the invention provides significant advantages over a conventional network arrangement. Because a client computer 301 can establish a session with any of the proxy servers 302 using the SSL/TLS session information obtained during a previous session, the load balancer 704 does not need to try to route a connection from a client computer 301 back to the proxy server 302 with which it had previously established a session. Thus, the function of the load balancer 704 can be simplified to distributing incoming communications from client computers 301A, 301B, 301C, 301D . . . 301Θ evenly among the available proxy servers 302A, 302B, 302C, 302D . . . 302Φ. Further, even if a proxy server 302 becomes completely unavailable (i.e., it suffers a complete failure), the client computer 301 can establish a new session with another proxy server 302 without having to recreate the SSL/TLS session information previously obtained in the earlier session.

While the above-described embodiment maintains a complete copy of the cache 706 in each cache memory 705, other embodiments of the invention may keep a copy of only a portion of the cache 706 in each cache memory 705 as shown in FIG. 7B. With these embodiments, however, the SSL/TLS session information for each session should still be stored in others of the multiple cache memories 705A, 705B, 705C, 705D . . . 705Φ so that each proxy server 302 can access the SSL/TLS session information. For example, the SSL/TLS session information for the session between the client 301A and the proxy server 302A may be stored in only the cache memory 705A (associated with proxy server 301A), cache memory 705B (associated with proxy server 301B), and cache memory 705C (associated with proxy server 301C). If the proxy server 302A then becomes unavailable and the client computer 301A is switched to a connection with the proxy server 302B, then the proxy server 302B can establish a session with the client computer 301A using the SSL/TLS session information retrieved from its own memory cache 302B.

Moreover, even if the client computer 301A is instead switched to a connection with a proxy server that does not have the SSL/TLS session information in its cache memory (e.g., proxy server 302D), then that proxy server can request the SSL/TLS session information from another, available proxy server 302 (e.g., proxy server 302B) that does have the appropriate SSL/TLS session information in its cache memory 705. For example, if the connection with the client computer 301A is switched to proxy server 302D, that proxy server 302D can sequentially request the SSL/TLS session information from the other available proxy servers 302 until it receives the SSL/TLS session information in reply. Alternately, the proxy server 302D may issue simultaneous requests to all of the other available proxy servers 302, and employ, e.g., the SSL/TLS session information in the first received reply.

The above-described embodiments of the invention may be referred to as peer configuration type embodiments, as the proxy servers 302 alone are responsible for maintaining the cache 706. With these peer configuration embodiments of the invention maintaining copies of the entire cache 706 (or copies of overlapping portions of the cache 706) in each cache memory 705A, 705B, 705C, 705D . . . 705Φ requires that each proxy server 302 transmit new or updated SSL/TLS session information to multiple cache memories 705 in a write process. Preferably, this write process is performed using a reliable communication technique that requires a positive acknowledgement from the receiving device, so that each proxy server 302 can confirm that its associated cache memory 705 has processed the new or updated SSL/TLS session information. If the number of proxy servers 302 in the network is relatively small, the type and amount of SSL/TLS session information being saved by the proxy servers 302 is relatively stable, and the total amount of SSL/TLS session information in the cache 706 is relatively small, then writing the necessary SSL/TLS session information to each cache memory 705A, 705B, 705C, 705D . . . 705Φ with this configuration using a reliable, positive acknowledgement based communication technique will not create a large resource overhead for the network 701. For example, if the network 701 only has nine proxy servers 302, then writing new or updated SSL/TLS session information to each proxy server 302 does not consume an inordinate amount of the network's resources.

If, on the other hand, the type of SSL/TLS session information stored in the cache 706 must be updated frequently, or the network includes a large number of proxy servers 302 (e.g., more than nine proxy servers), then writing each piece of new or updated SSL/TLS session information to every proxy server 302 in the network using a reliable, positive acknowledgement based communication technique may divert significant resources from the network 701. For example, as the number of client computers 301 increases, even infrequent updates to multiple cache memories 705 for each client computer 301 may divert a significant amount of resources from the network 701. Similarly, as the number of proxy servers 302 increases, writing new or updated SSL/TLS session information to the cache memory of each proxy server 302 using a reliable, positive acknowledgement based communication technique may divert a significant amount of resources from the network 701. Further, if the cache 706 becomes too large, it may be difficult to store a complete copy of the cache in the cache memory 705 of a proxy server 302.

Accordingly, a network 801 implementing yet another embodiment of the invention is shown in FIG. 8A. As with the previously discussed network arrangement 701, the network 801 includes a plurality of client computers 301A, 301B, 301C, 301D . . . 301Θ and a plurality of proxy servers 302A, 302B, 302C, 302D . . . 302Φ, each of which are connected to the application server 303. As also previously described, each client computer 301 is connected to a load balancer 704 through a communication medium 702 and a firewall 703. The load balancer 704 routes a connection from each client computer 301 to one of the proxy servers 302 (e.g., from client computer 301A to proxy server 302A as shown in the figure). Also, as with the network 701 shown in FIG. 2, each of the proxy servers 302A, 302B, 302C, 302D . . . 302Φ in the network 301 has an associated cache memory 705A, 705B, 705C, 705D . . . 705Φ.

This embodiment of the invention additionally includes, however, a cache repository 802, for storing one or more copies of the cache 706. As will be understood from the following explanation, this embodiment is thus a two-tiered configuration for storing the cache 706, rather than a peer configuration as with the previously discussed embodiments of the invention. That is, this embodiment has one tier of SSL/TLS session information storage provided by the cache memories 705A, 705B, 705C, 705D . . . 705Φ of the proxy servers 302A, 302B, 302C, 302D . . . 302Φ, and a second tier of SSL/TLS session information storage provided by the cache repository 802.

As seen in FIG. 8A, the cache repository 802 may include two cache memory server devices 803 and 804. Each of these cache memory server devices 803 and 804 stores a complete copy of the cache 706. It should be noted, however, that the cache repository 802 includes the two cache memory server devices 803 and 804 for redundancy. Thus, if one of the cache memory server devices 803 and 804 fails or otherwise becomes unavailable, the cache repository 802 will still include a complete copy of the cache 706 in the remaining cache memory server device. Other embodiments of the invention may alternately employ only a single cache memory server device as the repository 802 if redundancy is not desired, or three or more cache memory server devices if redundancy is a priority.

The cache memories 705A, 705B, 705C, 705D . . . 705Φ in the embodiment of FIG. 8A might not store copies of the entire cache 706. Instead, if the cache 706 is larger than can be stored in the cache memories 705A, 705B, 705C, 705D . . . 705Φ, each cache memory 705 may store only a portion of the cache 706 that relates to its associated proxy server 302. For example, the portion of the cache 706 copied into cache memory 705A may only include the SSL/TLS session information for sessions established with the proxy servers 301A and 301B. Thus, if the client computer 301A loses its connection to the proxy server 302A, and then tries to establish a new session with the proxy server 302B, the cache memory 705B may not contain SSL/TLS session information for the earlier session with the proxy server 302A.

With this embodiment, however, when a proxy server 302 receives a request to establish a session with a client computer 301 for which it's memory cache 705 does not have SSL/TLS session information, the proxy server 302 can obtain the relevant SSL/TLS session information from the cache repository 802. Thus, in the foregoing example, the proxy server 302B will obtain the SSL/TLS session information for the client computer's 301A previous session from the cache repository 802. The new proxy server 302 can then use the SSL/TLS session information to establish a new session with the same SSL/TLS session information as the previous session.

In addition to being useful where the size of the cache 706 is too large for an entire copy of the cache 205 to efficiently be stored in the cache memory 705 of a proxy server 302, this embodiment of the invention employing a cache repository 802 will typically also be more efficient for networks with very large numbers of proxy servers 302A, 302B, 302C, 302D . . . 302Φ (e.g., networks with more than ten proxy servers, depending upon whether the type of SSL/TLS session information being stored in the cache 706 requires the cache 706 to be updated frequently). With this embodiment, each proxy server 302 will normally need to use a reliable, positive acknowledgement communication technique to write new or updated SSL/TLS session information to only the cache repository 802, thereby reducing the amount of communication traffic (created by write operations and their confirmations) across the network. The other proxy servers 302 in the network can then obtain the new or updated SSL/TLS session information through less reliable communication techniques, or directly from the cache repository 802, as will be discussed below.

It should be noted, however, that the two-tiered arrangement shown in FIG. 8A is exemplary. Those of ordinary skill in the art will appreciate that three-tier, four-tier and other multiple tier arrangements can be employed, depending upon the total size of the cache 706. For example, if the size of the cache 706 is too large to be efficiently stored in a single cache memory server device 305 or 307, then two or more cache repositories 802 can be employed, each storing a different portion of the cache 706. An entire copy of the cache 706 may then be stored on a relatively inefficient storage device (e.g., a bank of magnetic disk storage devices) accessible to each of the cache repositories 802. Also, each proxy server 302 may then be associated with a particular cache repository 802, and store some or the entire portion of the cache 706 maintained by its associated cache repository 802. Various other embodiments will be apparent to those of ordinary skill in the art. Accordingly, the term "multi-tier" will be used hereafter to refer to embodiments of the invention having two or more hierarchical levels of devices storing at least a portion of the cache 205.

It also should be noted that, with alternate embodiments of invention, the different portions of the cache 706A, 706B, 706C, 706D . . . 706Φ stored in cache memories 705A, 705B, 705C, 705D . . . 705Φ may overlap. For example, the portion of the cache 705A may contain SSL/TLS session information that is also stored in the portion of the cache 705B and the portion of the cache 705C. Having some overlap between the different portions of the cache 706 may reduce the amount of network traffic, as a proxy server 302 may already have SSL/TLS session information for a new client computer 301 seeking connection. Further, each of the cache memories 705A, 705B, 705C, 705D . . . 705Φ may contain a copy of the entire cache 706, as shown in FIG. 8B. This embodiment of the invention may be preferable to the embodiment shown in FIG. 8A, when, e.g., the size of the cache 706 is sufficiently small to be stored in its entirety in a cache memory 705.

Figure 9:
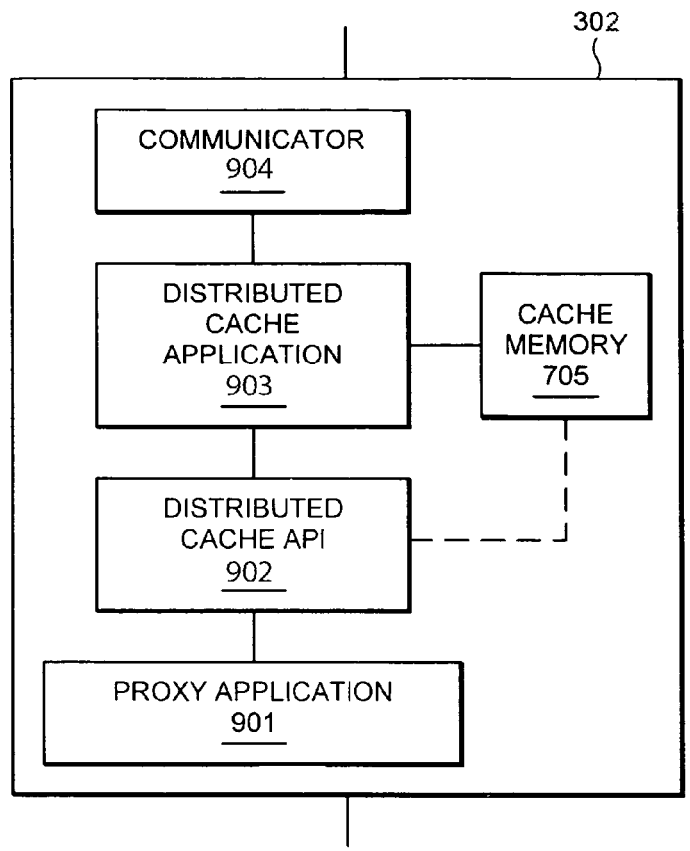
FIG. 9 illustrates a proxy server device according to one embodiment of the invention.

One possible embodiment of a proxy server 302 will now be described with reference to FIG. 9. As seen in this figure, the proxy server 302 includes a proxy application 901, a distributed cache application programming interface (API) 902, a distributed cache application 903, a communicator application 904, and the cache memory 705. As will be discussed in detail below, the proxy application 901 performs the primary functions of the proxy server 302, and includes each of the record detector 3021, the conventional SOCKS processing function 3022, the modified SOCKS processing function 3023, and the proxy function 3024. That is, the proxy application 901 establishes secure communication with a client computer 301, and relays messages between the client computer 301 and the application server 303. The proxy application 901 also sends SSL/TLS session information for a session with a client computer 301 to the distributed cache application 903 via the distributed cache API 902.

The distributed cache API 902 retrieves information from the cache memory 705, and facilitates requests to send information to or delete information from the cache memory 705 by passing them along to the distributed cache application 902. The distributed cache application 903 stores information in the cache memory 705, and also controls the exchange of information between the cache memory 705 and other proxy servers 302 (and, where applicable, the cache repository 802). The distributed cache application 903 communicates with the other proxy servers 302 (and the cache repository 802, where applicable) through the communicator application 904.

Accordingly, after completing the full SSL/TLS handshake, the proxy application 901 sends SSL/TLS session information obtained from the full SSL/TLS handshake to the cache memory 705 for storage.

More particularly, the proxy application 901 may form a record for storage in the cache 706 that includes a data field with the SSL/TLS resumption information and a key field with the SSL/TLS session identifier. The record may also include a time-to-live field with a time at which the record will expire and should be removed from the cache. In addition, the record may include a record identifier prepended to the key information (i.e., the session identifier), as will be discussed below. The proxy application 901 passes this record through the distributed cache API 902 to the distributed cache application 903 for storage in the cache memory 705.

When the proxy application 901 receives a request from a client computer 301 to initiate a session, the request will include a SSL/TLS session identifier if that client computer 301 has already established an SSL/TLS communication with a proxy application 901 (either the same proxy application 901 now receiving the request or another proxy application 901). The proxy application 901 then passes the SSL/TLS session identifier onto the cache API 902 as a search key, so that the API 902 may request the distributed cache application 903 to retrieve the SSL/TLS information from the cache memory 705 corresponding to the SSL/TLS session identifier.

As previously noted, the function of the distributed cache API 902 is to retrieve an existing record from the cache memory 705 using a GET operation. Further, the some embodiments of the invention, the distributed cache API 902 facilitates requests to add, delete or modify a record by passing these commands onto the distributed cache application 903. Thus, the distributed cache application 903 may perform ADD, DELETE and UPDATE operations on the cache memory 705. Preferably, the ADD operation adds a record to the cache memory 705 based upon the information in the record's key field, even if the record for that key already exists in the cache memory 705. The DELETE operation removes a record from the cache memory 705, while the UPDATE operation updates a record already existing in the cache memory 705. Also, the distributed cache application 903 may have the capability forcing a purge of each of the cache memories 705A, 705B, 705C, 705D . . . 705Φ.

It should be noted that the cache API 902 will first attempt to complete a GET operation by obtaining the requested record from the local copy of the cache 706 (or the copy of the portion of the cache 706) from the cache memory 705. With some preferred embodiments of the invention, this request will be immediately successful, as each cache memory 705 stores a complete copy of the cache 706. If the requested record is not found in the local cache memory 705, (e.g., if the cache memory 705 contains only a portion of the cache 706 that does not have the requested record or a copy of the cache 706 that has been corrupted), however, then the cache API 902 will involve the distributed cache application 903 to obtain the record from another source. With the peer configured embodiment of the invention shown in FIGS. 7A and 7B, the distributed cache application 903 will attempt to retrieve the requested record from one or more of the other proxy servers 302. In the multi-tier configured embodiment of the invention shown in FIGS. 8A and 8B, however, the distributed cache application 903 may instead attempt to retrieve the requested record from the cache repository 802.

Similarly, when the distributed cache application 903 adds, updates, or deletes a record from its local cache 705, it also relays the corresponding add, update or delete command to other devices in the network. For example, in the peer configured embodiment of the invention shown in FIGS. 7A and 7B, the distributed cache application 903 will relay the command to each of the other proxy servers 302. In the multi-tier configured embodiment of the invention shown in FIGS. 8A and 8B, however, the distributed cache application 903 may relay the command to the cache repository 802. The cache repository 802 may then in turn relay the command to one or more of the other proxy servers 302. In this manner, new or updated SSL/TLS session information obtained by the proxy application 901 of one proxy server 302 is conveyed to the other proxy servers 302 for use in future sessions with the client computer 301.

The storage of the SSL/TLS session information in the cache 706 by the distributed cache application 903 will now be discussed. As will be appreciated by those of ordinary skill in the art, as the number of proxy servers 302A, 302B, 302C, 302D . . . 302Φ increases, the number of possible sessions between client computers and proxy servers 302A, 302B, 302C, 302D . . . 302Φ also increases. Accordingly, the amount of SSL/TLS session information stored in the cache will increase as well. This is true for both the peer distributed cache embodiment exemplified in FIGS. 7A and 7B and for the multi-tiered distributed cache embodiment exemplified in FIGS. 8A and 8B. Accordingly, SSL/TLS session information should be stored in the cache 706 so that it can be quickly and efficiently retrieved when necessary. Some preferred embodiments of the invention may therefore use a hash table to implement the cache 706, and employ a hashing function to store and retrieve SSL/TLS session information from the hash table.

As is known in the art and discussed above, each piece of SSL/TLS session information may be stored in the cache 706 as part of a record. To enter a record into a hash table, the distributed cache application 903 performs a mathematical algorithm or "hash" operation on the key data in the key field (e.g., the SSL/TLS session identifier) in order to map the key data to a numerical value. The SSL/TLS session information identified by the key data is then stored in the hash table at a location (sometimes referred to as a "bucket")

corresponding to the numerical value against which the key data was mapped by the hash operation.

It should be noted that different key values may hash to the same hash value. Thus, different records may be stored in the same location in or bucket in the hash value. Accordingly, the hash operation preferably is selected so that an even distribution of hash values is obtained for the entire range of possible key data values. This is to ensure that a disproportionate number of records are not stored at a particular location in the hash table. That is, it is preferable to employ a hash operation that evenly distributes records in the hash table. Thus, when a record must be retrieved, the average retrieval time for a record from any location in the hash table should be close to or the same as from any other location in the hash table.

According to some preferred embodiments of the invention, the "BUZhash" hashing algorithm may be employed to evenly distribute SSL/TLS session information records in the cache 706. This hashing algorithm is described in the article "Hashing Concepts and the Java Programming Language," by Robert Uzgalis,® 1996, which article is incorporated entirely herein by reference. As explained in the article, the BUZhash algorithm conventionally operates as described below using the Sketchy Algorithm Language:

```
unsigned long PROC buzhash ( string key );
    unsigned long rtab[256] = { 64-bit-rand, 64-bit-rand,... };
    unsigned long h = 64-bit-rand;
    for i from 0 to size(key)
        h = cshift(h,1) XOR rtab[key[I]];
    return h;
```

Of course, those of ordinary skill in the art will appreciate that the BUZhash algorithm can be modified for different configurations of the cache 706 (e.g., different key ranges, etc.).

As discussed in the Uzgalis article, when applied to a binary key value, the BUZhash algorithm is particularly good at both generating a random number from any given key value and distributing the possible range of key values evenly in a table. Those of ordinary skill in the art will appreciate, however, that other hash algorithms known in the art may also be employed to store the SSL/TLS session information in the cache 706. Also, it will be apparent that new hash algorithms may be developed which can be used to store SSL/TLS session information in the cache 706.

It should be noted that the distributed cache application 903 treats all key values opaquely, and operates under the assumption that all key values are unique. That is, a unique key can only identify a single record in the cache 706. If a second record is added to the cache 706 with the same key data as an existing record, only one of the records will survive. It may be desirable, however, to use the same key data to refer to different records. For example, as previously explained, a SSL/TLS session identifier may be used as key data to identify a record with SSL/TLS resumption information. It may also be desirable to use the SSL/TLS session identifier to identify a different record, such as a record with authentication information for the user employing the client computer 301 (e.g., authentication information used to determine the data that the client computer's user may access from the application server 303).

Accordingly, with various embodiments of the invention the cache API 902 may provide for the use of a table identifier to distinguish between two different records that share the same key data. With these various embodiments of the invention, the proxy application 901 specifies a table identifier value that is pre-pended to the key data as part of all calls through the cache API 902 that involve the specification of key data. This allows the proxy application 901 to, in effect, specify a virtual table to which the record identified by a particular key should be written to or read from. Of course, as will be appreciated by those of ordinary skill in the art, because all records of the cache 706 are stored in a single hash table as described above, this is only a logical construct.

Preferably, the proxy application 901 is the responsible for ensuring that each table identifier value is properly created and consistently applied. The proxy application 901 may prepend the table identifier to the key and then pass the key to the cache API 902, or, alternatively, to omit a buffer allocation operation and a copy operation, the proxy application 901 may pass the table identifier to the cache API 902 and the cache API 902 may prepend the table identifier. Because the cache API 902 treats the table identifier as part of the key data, the proxy application 901 should preferably minimize the size of this value is as much as possible. Minimizing the size of the table identifier will allow for both optimal memory usage and optimal hashing performance.

The cache memory 705 may be any type of memory medium. As will be appreciated by those of ordinary skill in the art, however, the cache memory 705 may be preferably embodied in a readable and rewritable semiconductor memory device, commonly referred to as RAM or main memory, as this type of memory device allows information to be both quickly stored and retrieved.

Currently, computers that are conventionally used as server devices may have such memories that can store between 2 gigabytes and 4 gigabytes of information. Thus, approximately 2-4 million 1 kilobyte records can be stored in this type of memory device for each proxy server 301. Of course, other types of memory medium, such as a magnetic medium or an optical medium, may alternately be employed.

According to some embodiments of the invention, the communicator application 904 provides for point-to-point (i.e., acknowledgement based) communication, such as a unicast or TCP/IP-like communication between devices in the network. This type of communication is useful, for example, to synchronize SSL/TLS session information between a newly initiated cache memory 705 with an existing cache memory 705, to ensure that all of the SSL/TLS session information is accurately copied to the new cache memory 705 before it is used by its corresponding proxy application 901.

This type of point-to-point communication (e.g., unicast or TCP/IP-like communication) provided by the communicator application 904 can also be used by distributed cache application 903 to update or add individual records in the cache memories 705 of other proxy servers 302. As discussed above, however, with the embodiment of the invention shown in FIGS. 7A and 7B, the overhead on the network resources for writing SSL/TLS session information to each cache memory 705 increases as the number of proxy servers 302 increases. This is because each proxy server 302 must write new or updated SSL/TLS session information to each cache memory 705 using a separate write process, and then receive an acknowledgement of receipt of the write command from each cache memory 705 in reply, requiring a significant amount of network traffic and processor time for each proxy server 302 in the network 701. More specifically, the number of data packets that must be transmitted for each communication is 2N, where N is the number of devices (e.g., proxy servers 302) receiving the communication.

Thus, while the messages from the communicator application 904 can be individually delivered to each appropriate recipient device in the network using, e.g., point-to-point messaging, this type of communication restricts the speed and efficiency of the invention. Accordingly, with some preferred embodiments of the invention, the communicator application 904 also provides reliable multicast communication. As is known in the art, a communication technique may be considered reliable if (a) data packets transmitted according to the technique are correctly ordered and duplicates can be discarded by the receiving party, (b) the technique allows the receiving party to detect when data packets are missing from a transmission, and (c) the technique provides a repair mechanism for the receiving party to obtain data packets missing from a transmission. Multicasting, as is also well known in the art, is a procedure whereby different network devices receive a message sent to a single network address.

Therefore, the communicator application 904 may use reliable multicast transmissions to add, update, or delete SSL/TLS session information to or from the appropriate devices in the network. By using reliable multicasting, these embodiments of the invention advantageously convey SSL/TLS session information to a number of different devices simultaneously, simply by transmitting the SSL/TLS session information to a single, shared multicast address. As previously noted, the process of multicasting is well known in the art and several multicasting protocols, such as the multicast transfer protocol (MTP), have been established to facilitate multicast communications.

One type of reliable multicast communication technique is the multicast communication with positive application acknowledgement. With this technique, an application receiving the multicast transmission sends an acknowledgement back to the device originating the multicast transmission after the application has successfully processed the transmitted data. This type of reliable multicast communication may preferably be employed by the communicator application 904 when relaying an ADD command from the distributed cache application 903 to add SSL/TLE session information to other cache memories 705 in a peer configuration embodiment (or to the cache repository 802 in a multi-tier configuration embodiment). In the peer configuration embodiment, using a reliable positive-acknowledgement multicast communication technique reduces the number of data packets that must be transmitted across the network for each communication to 1+N, where N is the number of devices (e.g., proxy servers 302) receiving the communication. That is, one communication is multicast to each of N devices, and N positive acknowledgements are transmitted back to the originating device.

While reliable positive acknowledgement multicasting allows multiple devices to reliably receive updated or new SSL/TLS session information simultaneously, it may still require significant network resources to implement with the peer configuration. Because each device receiving a multicast message will need to individually acknowledge receipt of the communication to the network device from which the message originated, in a network with a large number of proxy servers 302 (i.e., where N becomes large), transmitting SSL/TLS session information to each proxy server 302 using reliable positive acknowledgement multicasting may still substantially impair the performance of the network.

For various applications of the invention, however, employing the multi-tier configuration embodiments described above can reduce the use of network resources still further. With these embodiments, new or updated state information need be transmitted to only the cache repositories 802 using a reliable, positive-acknowledgement based communication technique. The proxy servers 302 can then obtain the new or updated state information using a less-reliable (and thus typically less expensive in terms of network resources) communication technique, or obtain the new or updated state information from a cache repository 802 when needed. Thus, by using the multi-tier configuration, the number of packets that must be transmitted across the network for each addition of new or updated state information can be reduced still further to 1+n, where n is the number of cache repositories 802 receiving the new or updated state information. Because the number n of cache repositories 802 will typically be much smaller than the number N of proxy server 302 in the invention, using the multi-tier configuration can substantially reduce the use of network resource, both in network traffic and processing time for individual resources, required to cache new or updated state information.

With the multi-tier configurations embodiments of the invention, the proxy servers 302 may then receive new or updated state information using, for example, a negative acknowledgment (NACK) technique to provide reliable multicast communication, instead of the positive acknowledgment technique discussed above. With a negative acknowledgment multicast procedure, the devices receiving the multicast message do not send an acknowledgment to the originating device upon receipt of the message. Instead, each receiving device responds to the originating device only when it determines that it has missed a portion of the multicast communication.

For example, some communication protocols require that each segment of data in a communication be sequentially numbered. Thus, with the negative acknowledgement procedure, a device receiving a communication according to such a protocol a might respond to the originating device only when it recognized that it had not received one of the data segments (i.e., when it determined that it was missing a sequentially numbered data segment). Accordingly, the communicator application 904, according to various embodiments of the invention, employs this technique to provide negative acknowledgements to another device in the network when it recognizes that it has not received data from that device.

Thus, this negative acknowledgement reliable multicast arrangement can be used to deliver new or updated SSL/TLS session information to each of the proxy servers 302 in mult-multi-tier configuration embodiments of the invention, thereby reducing the amount of communication traffic between the devices. Of course, both a positive acknowledgement multicast communication and a negative acknowledgement multicast communication can be accomplished using a single multicast transmission at all of the relevant receiving devices. The device sending the transmission will then wait until receiving positive acknowledgements from all of the devices designated to communicate using the positive acknowledgement technique before sending another multicast transmission. The sending device will then also respond to any negative acknowledgement it receives according to the appropriate negative acknowledgement multicast communication protocol.

Conventional negative acknowledgement reliable multicast communication techniques present an additional problem, however, sometimes referred to as "overrunning." In this situation, the transmitting device sends data faster than one or more of the receiving devices can process it, resulting in some of the transmitted data being lost. Further, the transmitting device may send out too much information to receive a negative acknowledgment from another device indicating that a portion of the communication was lost. The extent of this problem is dependent upon the flow rate of communication traffic across the network, however. When there is little communication traffic over the network, however then the device initiating the multicast communication will be able to transmit information faster without overrunning a receiving device or missing a negative acknowledgement. Likewise, when the communication traffic over the network increases, the device initiating the multicast communication should transmit data more slowly to avoid overrunning a receiving device or missing a negative acknowledgement.

To address this problem, some prior art negative acknowledgment multicast systems have proposed to set an absolute limit on the rate at which data is transmitted in a multicast communication, to ensure that a negative acknowledgment from another device is received under all circumstances. This constant-rate solution of the prior art, however, does not take into varying communication traffic flow across the network. Instead, it always operates at the lowest possible efficiency to ensure that all negative acknowledgments are received. Other prior art systems use deterministic techniques with a "master" and "token" arrangement, but these systems are relatively slow, inefficient and complex.

Figures 10A, 10B:
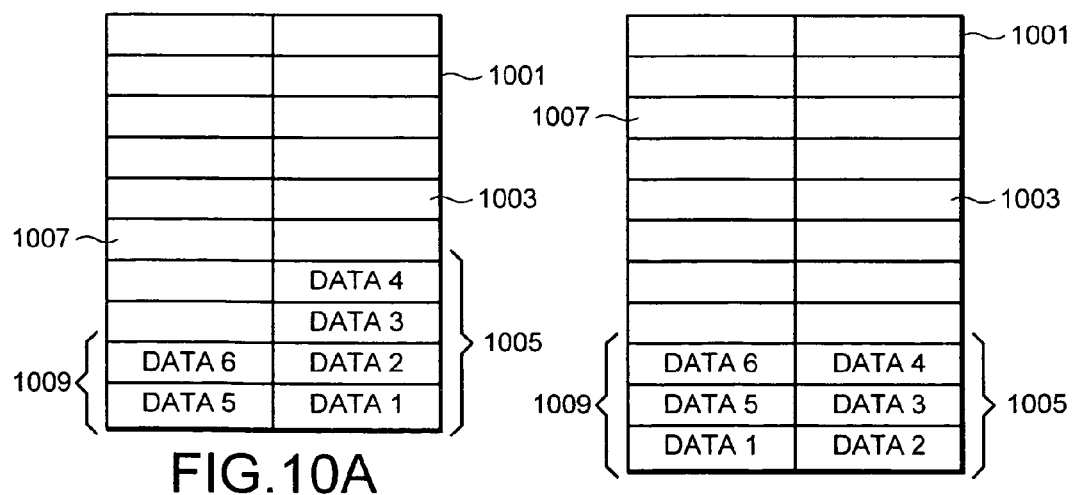
FIGS. 10A and 10B illustrate a network flow level detection technique according to an embodiment of the invention.

Accordingly, with some preferred embodiments of the invention, the communicator application 904 may provide negative acknowledgement reliable multicast communications in conjunction with a traffic flow rate detection process for determining the flow of communication traffic across the network. By accurately detecting the flow of communication traffic across the network, the communicator application 904 can correspondingly increase or decrease the rate at which it transmits data in the reliable negative acknowledgement multicast communication. This flow rate detection process will now be discussed with reference to FIGS. 10A and 10B.

As shown in these figures, the communicator application 904 has a data interface portion 1001. The interface 1001 includes an output queue 1002 containing data segments 1003 to be multicast to other devices in the network. The interface 1001 also has an input queue 1004 containing data segments 1005 that have been received via multicast communications from other devices. According to these preferred embodiments of the invention, the communicator application 904 may include itself as a recipient of its own multicast transmission. Thus, the communicator application 904 will receive the data segment it transmitted to other devices in the network. By determining when a recently-transmitted packet of data is received back at the communicator application 904, the communicator application 904 can determine the level of traffic flow in the network. For example, with some preferred embodiments of the invention, the communicator application 904 may refrain from outputting another data segment from the output queue 1002 until it has received a previously-transmitted data segment in its input queue 1004.

As will be appreciated by those of ordinary skill in the art, a number of variations for this flow rate detection technique are possible. For example, the communicator application 904 may postpone sending a new data segment (e.g., Data 2 shown in FIGS. 5A and 5B) until the transmitted data segment immediately preceding it (e.g., Data 1) is received in the input queue 1004 (see FIG. 10B). Alternately, the communicator application 904 may determine an average number of data segments in the input queue 1004 that occur between its own transmitted data segments to ascertain the current flow conditions of traffic across the network. Numerous other modifications are also possible using the receipt of self-transmitted data segments to determine flow conditions of traffic across the network. Further, this technique can be employed even for communications that are not multicast. For example, the communicator application 904 may be able to send a copy of a point-to-point message to itself on a feedback loop. The communicator application 904 can then use the occurrence of a message in the input queue 1004 that the communicator application 904 has sent to itself to determine the amount of traffic on the network.

Also, as previously explained, the same multicast transmissions can be employed to deliver messages using both a positive-acknowledgement multicast communication technique and a negative-acknowledgement multicast communication technique. It should be noted that, when the negative-acknowledgement multicast communication technique is used in conjunction with flow detection, the flow control feature used with the negative-acknowledgement multicast technique will control the operation of the positive-acknowledgement multicast technique. That is, the sending device will not send out multicast transmissions to any device, including those devices communicating with the positive-acknowledgement multicast communication technique, faster than permitted by the flow control feature.

This flow-controlled negative acknowledgement multicast communication technique may therefore preferable be provided by the communication application 904 in multi-tier configurations of the invention to distribute new and updated SSL/TLS session information to the proxy servers 302 without significantly increasing the use of the network's resources, both in terms of network traffic and in processing time required by the transmitting and receiving devices. Of course, the communicator application 904 may also provide communication techniques with no reliability for various administrative functions of the proxy server 302.

Thus, by using reliable multicast communication techniques (i.e., the positive acknowledgement multicast communication technique and the flow-controlled negative acknowledgement multicast communication technique) to deliver SSL/TLS session information to multiple devices at the same time, SSL/TLS session information for a session between a proxy server 302 and a client computer 301 can be efficiently cached in a plurality of different cache memories 705 and cache repositories 802. If a connection between a client computer 301 and one proxy server 302 is terminated, another proxy server 302 can then resume the session with the client computer using the cached SSL/TLS session information.

Although specific embodiments of the invention have been described, various modifications, alterations, alternative constructions, and equivalents are also encompassed within the scope of the invention. For example, in addition to storing SSL/TLS session information described above, other information may be conveniently stored in the cache 706. For example, if a client computer 301 and a proxy server 302 designate one or more ports used to transmit encrypted data, these ports may be stored in the cache 706 to facilitate resuming a SSL/TLS session with the client computer 301. Also, if the client computer 301 provides the IP address and port of the target application server 303, this information may also conveniently be stored in the cache 706 to facilitate resuming a SSL/TLS session with the client computer 301. Further, for SSL/TLS sessions generated with the modified SSL/TLS, the cache 706 may store nonces exchanged during the session. Thus, if the session is resumed with a different proxy server 302, the new server 302 can detect when a datagram has already been received.

It should also be noted that the described invention is not restricted to operation within certain specific data processing environments, but is free to operate within a plurality of data processing environments, such as a distributed computer network environment, a single stand-alone computer system environment, or other computing environments. Additionally, although the present invention has been described using a particular series of transactions and steps, it should be apparent to those skilled in the art that the scope of the present invention is not limited to the described series of transactions and steps.

There is inherent flexibility in creating the logic, system flow, tables, and data structures used for programming the present invention. Data structures and values upon which calculations are performed may be explicit, derived from other data, imported from other sources, or result from program calculations or logical operations, all without departing from the spirit or limiting the scope of the invention. The algorithms for indexing, searching and data processing in this patent may be substituted or modified to support various performance and/or systems integration requirements, all without deviating from the spirit or limiting the scope of the invention.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

Reference numerals in the appended method claims identifying steps are for convenience only and are not intended to imply a necessary ordering of the steps. It is, therefore, to be understood that within the scope of the appended claims the invention may be practiced otherwise than as specifically described. No claim should be interpreted to be in means-plus-function format.

What is claimed is:

1. A method of securely transmitting a data record to or from a client computer, the method comprising:
   establishing a connection between the client computer and a proxy server;
   exchanging encryption credentials between the client computer and the proxy server over the connection;
   agreeing between the client computer and the proxy server to use an unreliable transport protocol to transmit an encrypted data record from a sender to a receiver, wherein the receiver sends a message to the sender relating the receipt of the encrypted data record only after identifying that the encrypted data record received has a missing portion, the message sent to the sender in the form of a negative acknowledgement;
   agreeing between the client computer and the proxy server that the encrypted data record will be transmitted using a particular port;
   generating a nonce for the data record before the data record is encrypted;
   encrypting the data record using the nonce;
   appending the nonce the encrypted data record; and
   transmitting the encrypted data record to or from the client computer using the unreliable transport protocol.

2. The method of claim 1 further comprising:
   identifying of a second server by the client computer;
   identifying data residing on the second server by the client computer;
   transmitting of the identified data from the second server to the proxy server; and
   transmitting of the identified data from the proxy server to the client computer, wherein the identified data transmitted from the proxy server to the client computer includes the encrypted data record.

3. The method of claim 2, further comprising sending information by the client computer to the proxy server regarding the second server.

4. The method of claim 3, wherein the information sent includes the internet protocol address of the second server.

5. The method of claim 3, wherein the information sent identifies a port on the second sever through which the identified data is sent from the second server to the proxy server.

6. The method of claim 1, further comprising attaching a header to the transmitted data that includes an encrypted bit, wherein the encrypted bit is set when the transmitted data includes encrypted data.

7. A non-transitory computer readable storage medium having embodied thereon a program executable by a processor to perform a method for securely transmitting a data record to or from a client computer, the method comprising:
   establishing a connection between the client computer and a proxy server;
   exchanging encryption credentials between the client computer and the proxy server over the connection;
   agreeing between the client computer and the proxy server to use an unreliable transport protocol to transmit an encrypted data record from a sender to a receiver, wherein the receiver sends a message to the sender relating the receipt of the encrypted data record only after identifying that the encrypted data record received has a missing portion, the message sent to the sender in the form of a negative acknowledgement;
   agreeing between the client computer and the proxy server that a data record will be transmitted using a particular port;
   generating a nonce for the data record before the data record is encrypted;
   encrypting the data record using the nonce;
   appending the nonce the encrypted data record; and
   transmitting the encrypted data record to or from the client computer using the unreliable transport protocol.

8. The non-transitory computer readable storage medium of claim 7, the program further executable to:
   identify a second server by the client computer;
   identify data residing on the second server by the client computer to be transmitted to the client computer;
   transmit the identified data from the second server to the proxy server; and
   transmit the identified data from the proxy server to the client computer, wherein the identified data transmitted from the proxy server to the client computer includes the encrypted data record.

9. The non-transitory computer readable storage medium of claim 8, the program further executable to send information by the client computer to the proxy server regarding the second server.

10. The non-transitory computer readable storage medium of claim 9, wherein the information sent includes the internet protocol address of the second server.

11. The non-transitory computer readable storage medium of claim 9, wherein the information sent identifies a port on the second sever through which the identified data is sent from the second server to the proxy server.

12. The non-transitory computer readable storage medium of claim 7, the program further executable to attach a header to the transmitted data that includes an encrypted bit, wherein the encrypted bit is set when the transmitted data includes encrypted data.

13. A system for securely transmitting a data record to or from a client computer, the system comprising:
 a client computer;
 a memory in the client computer;
 a proxy server; and
 a memory in the proxy server, wherein:
  a connection between the client computer and the proxy server is established,
  encryption credentials between the client computer and the proxy server are exchanged over the connection,
  the client computer and the proxy server agree to use an unreliable transport protocol to transmit an encrypted data record from a sender to a receiver, wherein the receiver sends a message to the sender relating the receipt of the encrypted data record only after identifying that the encrypted data record received has a missing portion, the message sent to the sender in the form of a negative acknowledgement;
  the client computer and the proxy server agree that the data record will be transmitted using a particular port,
  a nonce for the data record is generated,
  the data record is encrypted using the nonce,
  the nonce is appended to the encrypted data record, and
  the encrypted data record is transmitted to or from the client computer using the protocol.

14. The system of claim 13, further comprising:
 a second server; and
 a memory in the second server, wherein:
  the second server is identified by the client computer,
  data residing on the second server being is identified by the client computer,
  the second server transmits the identified data to the proxy server, the proxy server securely transmits the identified data to the client computer, and
  the identified data transmitted from the proxy server to the client computer include the encrypted data record.

15. The system of claim 14, wherein information is sent by the client computer to the proxy server regarding the second server.

16. The system of claim 15, wherein the information sent includes the internet protocol address of the second server.

17. The system of claim 15, wherein the information sent identifies a port on the second sever through which the identified data is sent from the second server to the proxy server.

18. The system of claim 13, wherein a header is attached to the transmitted data that includes an encrypted bit and the encrypted bit is set when the transmitted data includes encrypted data.

\* \* \* \* \*